(12) United States Patent
Beck et al.

(10) Patent No.: US 11,336,670 B2
(45) Date of Patent: May 17, 2022

(54) SECURE COMMUNICATION PLATFORM FOR A CYBERSECURITY SYSTEM

(71) Applicant: Darktrace Limited, Cambridge (GB)

(72) Inventors: Michael Beck, London (GB); Jack Stockdale, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 418 days.

(21) Appl. No.: 16/279,031

(22) Filed: Feb. 19, 2019

(65) Prior Publication Data

US 2019/0260804 A1 Aug. 22, 2019

Related U.S. Application Data

(60) Provisional application No. 62/632,623, filed on Feb. 20, 2018.

(51) Int. Cl.
*G06F 3/048* (2013.01)
*H04L 29/06* (2006.01)
(Continued)

(52) U.S. Cl.
CPC ........ *H04L 63/1425* (2013.01); *G06F 3/0486* (2013.01); *G06F 3/04842* (2013.01);
(Continued)

(58) Field of Classification Search
CPC . H04L 63/1425; H04L 63/1416; H04L 63/20; H04L 63/14; H04L 43/045;
(Continued)

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
(Continued)

*Primary Examiner* — Steven B Theriault
(74) *Attorney, Agent, or Firm* — Rutan & Tucker, LLP

(57) ABSTRACT

An expert interface component can automatically connect a system user with a system support expert. A user interface module can present a threat-tracking graphical user interface and a query interface component integrated into the threat-tracking graphical user interface to a system user belonging to a client team to review a potential cyber threat and receive a query for assistance. The query interface component can allow the system user to digitally grab a visual data container displaying information and containing a data object. The query interface component can collect the visual data container from the threat-tracking graphical user interface into a collection window of the query interface component. A communication module provides an incident ticket containing the query and the visual data container to a system support expert at a remote platform.

17 Claims, 17 Drawing Sheets

510
90% 98%

520
90% 98%

530
90% 98%

(51) Int. Cl.
  *G06N 20/10* (2019.01)
  *G06N 20/00* (2019.01)
  *G06N 20/20* (2019.01)
  *H04L 51/42* (2022.01)
  *G06F 21/36* (2013.01)
  *H04L 43/045* (2022.01)
  *G06F 16/2455* (2019.01)
  *G06F 3/04842* (2022.01)
  *G06F 3/0486* (2013.01)
  *H04L 41/22* (2022.01)
  *G06K 9/62* (2022.01)
  *G06F 21/55* (2013.01)
  *H04L 51/00* (2022.01)
  *G06F 40/40* (2020.01)

(52) U.S. Cl.
  CPC .......... *G06F 16/2455* (2019.01); *G06F 21/36* (2013.01); *G06F 21/554* (2013.01); *G06F 21/556* (2013.01); *G06F 40/40* (2020.01); *G06K 9/622* (2013.01); *G06K 9/6218* (2013.01); *G06N 20/00* (2019.01); *G06N 20/10* (2019.01); *G06N 20/20* (2019.01); *H04L 41/22* (2013.01); *H04L 43/045* (2013.01); *H04L 51/12* (2013.01); *H04L 51/22* (2013.01); *H04L 63/0209* (2013.01); *H04L 63/0428* (2013.01); *H04L 63/101* (2013.01); *H04L 63/14* (2013.01); *H04L 63/1416* (2013.01); *H04L 63/1433* (2013.01); *H04L 63/1441* (2013.01); *H04L 63/20* (2013.01)

(58) Field of Classification Search
  CPC ... H04L 63/1441; G06F 21/554; G06F 21/36; G06F 3/04842; G06F 3/0486
  See application file for complete search history.

(56) References Cited

U.S. PATENT DOCUMENTS

| | | | |
|---|---|---|---|
| 7,307,999 B1 | 12/2007 | Donaghey | |
| 7,418,731 B2 | 8/2008 | Touboul | |
| 7,448,084 B1 | 11/2008 | Apap et al. | |
| 7,895,641 B2* | 2/2011 | Schneier | H04L 63/1416 726/3 |
| 8,132,260 B1* | 3/2012 | Mayer | H04L 67/125 726/25 |
| 8,312,540 B1 | 11/2012 | Kahn et al. | |
| 8,819,803 B1 | 8/2014 | Richards et al. | |
| 8,879,803 B2 | 11/2014 | Ukil et al. | |
| 8,966,036 B1 | 2/2015 | Asgekar et al. | |
| 9,043,905 B1 | 5/2015 | Allen et al. | |
| 9,106,687 B1 | 8/2015 | Sawhney et al. | |
| 9,118,714 B1* | 8/2015 | Thomson | H04L 63/1433 |
| 9,185,095 B1 | 11/2015 | Moritz et al. | |
| 9,210,185 B1* | 12/2015 | Pinney Wood | G06F 21/577 |
| 9,213,990 B2 | 12/2015 | Adjaoute | |
| 9,401,925 B1 | 7/2016 | Guo et al. | |
| 9,516,039 B1 | 12/2016 | Yen et al. | |
| 9,516,053 B1* | 12/2016 | Muddu | H04L 63/1433 |
| 9,582,408 B1* | 2/2017 | Jayaraman | G06F 11/3672 |
| 9,641,544 B1 | 5/2017 | Treat et al. | |
| 9,712,548 B2 | 7/2017 | Shmueli et al. | |
| 9,727,723 B1 | 8/2017 | Kondaveeti et al. | |
| 9,825,986 B1* | 11/2017 | Bhatkar | H04L 63/1441 |
| 10,032,361 B2* | 7/2018 | Chadwick | G08B 25/08 |
| 10,298,605 B2* | 5/2019 | Chen | H04L 63/1416 |
| 10,324,609 B2* | 6/2019 | Sanches | G06F 8/38 |
| 10,348,758 B1* | 7/2019 | Holl | H04L 63/1433 |
| 10,394,802 B1* | 8/2019 | Porath | G06F 16/24578 |
| 10,505,825 B1* | 12/2019 | Bettaiah | H04L 43/045 |
| 10,567,415 B2* | 2/2020 | Doppke | G06F 21/577 |
| 10,708,291 B2* | 7/2020 | Findlay | H04L 63/1441 |
| 10,902,114 B1* | 1/2021 | Trost | G06F 16/26 |
| 2002/0186698 A1 | 12/2002 | Ceniza | |
| 2003/0070003 A1 | 4/2003 | Chong et al. | |
| 2004/0083129 A1 | 4/2004 | Herz | |
| 2004/0167893 A1 | 8/2004 | Matsunaga et al. | |
| 2005/0065754 A1 | 3/2005 | Schaf et al. | |
| 2007/0067847 A1* | 3/2007 | Wiemer | H04L 63/1433 726/25 |
| 2007/0118909 A1 | 5/2007 | Hertzog et al. | |
| 2007/0294187 A1 | 12/2007 | Scherrer | |
| 2008/0005137 A1 | 1/2008 | Surendran et al. | |
| 2008/0109730 A1 | 5/2008 | Coffman et al. | |
| 2008/0271143 A1* | 10/2008 | Stephens | H04L 63/1425 726/22 |
| 2009/0106174 A1 | 4/2009 | Battisha et al. | |
| 2009/0254971 A1 | 10/2009 | Herz et al. | |
| 2010/0009357 A1 | 1/2010 | Nevins et al. | |
| 2010/0095374 A1 | 4/2010 | Gillum et al. | |
| 2010/0125908 A1 | 5/2010 | Kudo | |
| 2010/0235908 A1 | 9/2010 | Eynon et al. | |
| 2010/0299202 A1 | 11/2010 | Collazo | |
| 2011/0093428 A1 | 4/2011 | Wisse | |
| 2011/0213742 A1 | 9/2011 | Lemmond et al. | |
| 2011/0261710 A1 | 10/2011 | Chen et al. | |
| 2012/0096549 A1 | 4/2012 | Amini et al. | |
| 2012/0137367 A1 | 5/2012 | Dupont et al. | |
| 2012/0209575 A1 | 8/2012 | Barbat et al. | |
| 2012/0210388 A1 | 8/2012 | Kolishchak | |
| 2012/0284791 A1 | 11/2012 | Miller et al. | |
| 2012/0304288 A1 | 11/2012 | Wright et al. | |
| 2012/0311562 A1* | 12/2012 | Wang | H04L 67/22 717/177 |
| 2013/0091539 A1 | 4/2013 | Khurana et al. | |
| 2013/0174259 A1* | 7/2013 | Pearcy | H04L 41/06 726/25 |
| 2013/0198119 A1 | 8/2013 | Eberhardt, III et al. | |
| 2013/0198840 A1 | 8/2013 | Drissi et al. | |
| 2013/0254885 A1 | 9/2013 | Devost | |
| 2013/0305369 A1* | 11/2013 | Karta | H04L 63/1416 726/23 |
| 2014/0007237 A1 | 1/2014 | Wright et al. | |
| 2014/0058730 A1* | 2/2014 | Costa | G06Q 10/06 704/235 |
| 2014/0074762 A1 | 3/2014 | Campbell | |
| 2014/0165207 A1 | 6/2014 | Engel et al. | |
| 2014/0214744 A1* | 7/2014 | Froelich | G06N 5/02 706/46 |
| 2014/0215618 A1 | 7/2014 | Amit | |
| 2014/0259095 A1* | 9/2014 | Bryant | H04L 63/145 726/1 |
| 2014/0278664 A1* | 9/2014 | Loomis | G06T 19/006 705/7.17 |
| 2014/0325643 A1 | 10/2014 | Bart et al. | |
| 2015/0067835 A1 | 3/2015 | Chari et al. | |
| 2015/0081431 A1 | 3/2015 | Akahoshi et al. | |
| 2015/0161394 A1 | 6/2015 | Ferragut et al. | |
| 2015/0163121 A1 | 6/2015 | Mahaffey et al. | |
| 2015/0172300 A1 | 6/2015 | Cochenour | |
| 2015/0172321 A1* | 6/2015 | Kirti | H04L 63/1441 726/1 |
| 2015/0180893 A1 | 6/2015 | Im et al. | |
| 2015/0213246 A1* | 7/2015 | Turgeman | G06F 21/31 726/23 |
| 2015/0213358 A1 | 7/2015 | Shelton et al. | |
| 2015/0286819 A1 | 10/2015 | Coden et al. | |
| 2015/0310195 A1 | 10/2015 | Bailor et al. | |
| 2015/0319185 A1 | 11/2015 | Kirti et al. | |
| 2015/0341379 A1 | 11/2015 | Lefebvre et al. | |
| 2015/0363699 A1 | 12/2015 | Nikovski | |
| 2015/0379110 A1 | 12/2015 | Marvasti et al. | |
| 2016/0021135 A1* | 1/2016 | Chesla | G06F 21/552 726/23 |
| 2016/0062950 A1 | 3/2016 | Brodersen et al. | |
| 2016/0078365 A1 | 3/2016 | Baumard | |
| 2016/0103838 A1* | 4/2016 | Sainani | H04L 41/5012 707/725 |
| 2016/0149941 A1 | 5/2016 | Thakur et al. | |
| 2016/0164902 A1 | 6/2016 | Moore | |

(56) References Cited

U.S. PATENT DOCUMENTS

| | | | |
|---|---|---|---|
| 2016/0164905 A1* | 6/2016 | Pinney Wood | G06F 21/577 726/25 |
| 2016/0173446 A1* | 6/2016 | Nantel | H04L 63/0209 726/11 |
| 2016/0173509 A1 | 6/2016 | Ray et al. | |
| 2016/0212165 A1* | 7/2016 | Singla | H04L 63/1433 |
| 2016/0212172 A1* | 7/2016 | Senanayake | G06F 3/04815 |
| 2016/0219078 A1* | 7/2016 | Porras | H04L 41/12 |
| 2016/0241576 A1 | 8/2016 | Rathod et al. | |
| 2016/0308890 A1* | 10/2016 | Weilbacher | H04L 63/1433 |
| 2016/0308898 A1* | 10/2016 | Teeple | H04L 63/1441 |
| 2016/0352768 A1 | 12/2016 | Lefebvre et al. | |
| 2016/0373476 A1 | 12/2016 | Dell'Anno et al. | |
| 2017/0048276 A1* | 2/2017 | Bailey | G06F 3/04842 |
| 2017/0063907 A1 | 3/2017 | Muddu et al. | |
| 2017/0063910 A1 | 3/2017 | Muddu et al. | |
| 2017/0063911 A1 | 3/2017 | Muddu et al. | |
| 2017/0063917 A1* | 3/2017 | Chesla | H04L 63/20 |
| 2017/0063920 A1* | 3/2017 | Thomas | H04L 63/1408 |
| 2017/0169360 A1 | 6/2017 | Veeramachaneni et al. | |
| 2017/0220801 A1 | 8/2017 | Stockdale et al. | |
| 2017/0230391 A1 | 8/2017 | Ferguson et al. | |
| 2017/0230392 A1 | 8/2017 | Stockdale | |
| 2017/0230412 A1* | 8/2017 | Thomas | H04L 9/002 |
| 2017/0243008 A1* | 8/2017 | Cornell | G06Q 10/0633 |
| 2017/0251012 A1 | 8/2017 | Stockdale et al. | |
| 2017/0270422 A1 | 9/2017 | Sorakado | |
| 2018/0006913 A1* | 1/2018 | Asenjo | H04L 41/0631 |
| 2018/0027006 A1 | 1/2018 | Zimmermann et al. | |
| 2018/0077190 A1* | 3/2018 | Mowry | G06F 16/248 |
| 2018/0091529 A1* | 3/2018 | Luger | H04L 63/1483 |
| 2018/0167402 A1 | 6/2018 | Scheidler et al. | |
| 2018/0309788 A1* | 10/2018 | Johnson | H04L 63/104 |
| 2018/0309791 A1* | 10/2018 | Johnson | H04L 63/102 |
| 2018/0314411 A1* | 11/2018 | Vora | H04L 41/22 |
| 2018/0314833 A1* | 11/2018 | Vittal | H04L 63/1425 |
| 2018/0324202 A1* | 11/2018 | Lim | H04L 63/1416 |
| 2018/0375892 A1* | 12/2018 | Ganor | H04L 63/20 |
| 2019/0089742 A1* | 3/2019 | Hill | H04L 41/22 |
| 2019/0097909 A1* | 3/2019 | Puri | H04L 43/16 |
| 2019/0121978 A1* | 4/2019 | Kraemer | G06F 21/554 |
| 2019/0190927 A1* | 6/2019 | Peng | H04L 41/22 |
| 2019/0227822 A1* | 7/2019 | Azmoon | G06F 40/35 |
| 2019/0260769 A1* | 8/2019 | Sharon | H04L 63/1416 |
| 2020/0244673 A1* | 7/2020 | Stockdale | H04L 43/045 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

* cited by examiner

| Category | Data Container | Query | Timestamp | Owner | Status |
|---|---|---|---|---|---|
| 1502 | 1504 | 1506 | 1508 | 1510 | 1512 |

Fig. 15

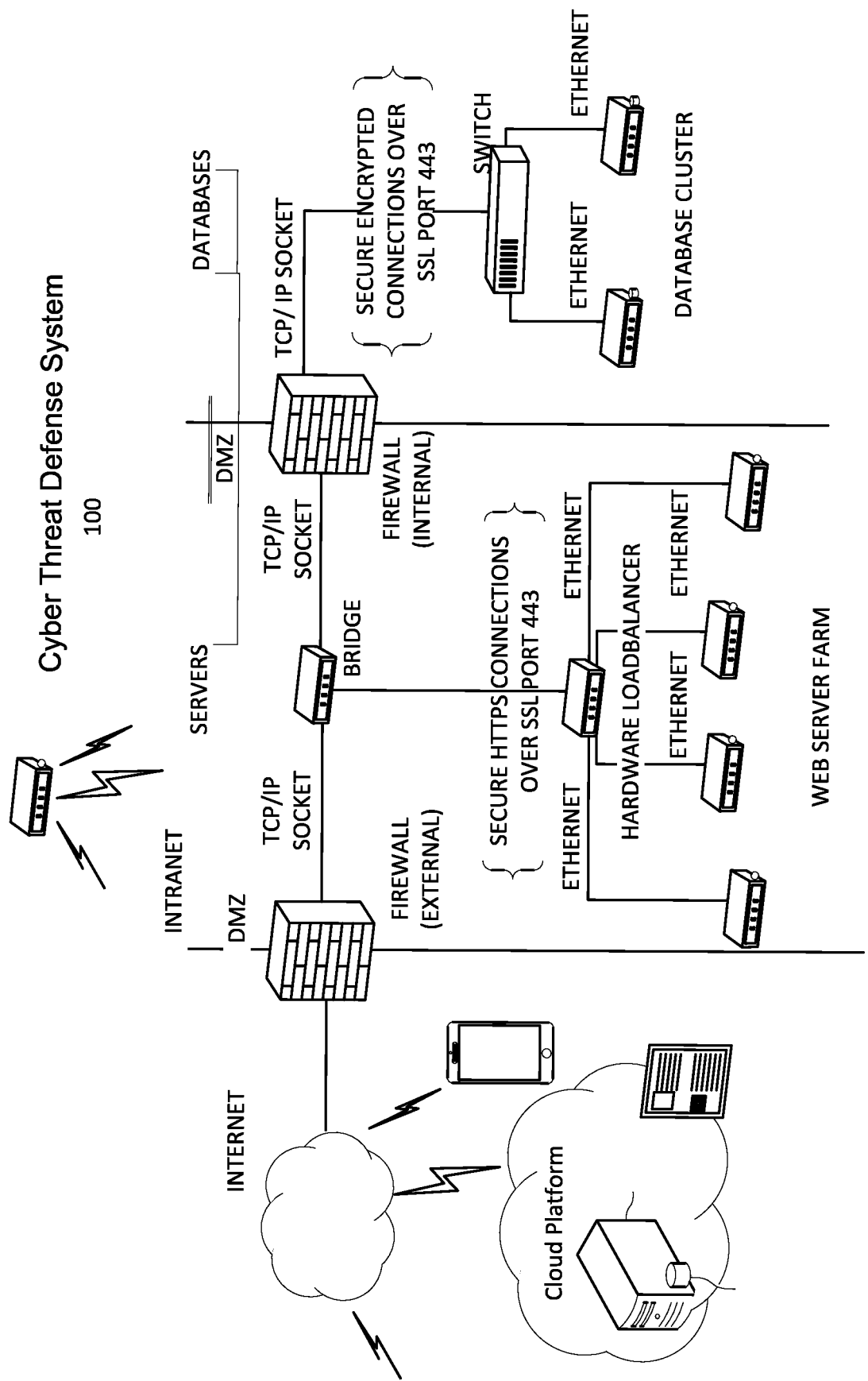

SECURE COMMUNICATION PLATFORM FOR A CYBERSECURITY SYSTEM

RELATED APPLICATION

This application claims priority to and the benefit of under 35 USC 119 of U.S. provisional patent application titled "A cyber threat defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system. In an embodiment, a cyber threat defense system may automatically replace personally identifiable information with an alias.

BACKGROUND

In the cyber security environment, firewalls, endpoint security methods and other tools such as security information and event management systems (SIEMs) and restricted environments, such as sandboxes, are deployed to enforce specific policies and provide protection against certain threats. These tools currently form an important part of an organization's cyber defense strategy, but they are insufficient in the new age of cyber threat.

Cyber threat, including email threats, viruses, Trojan horses, and worms, can subtly and rapidly cause harm to a network. Additionally, human users may wreak further damage to the system by malicious action. A cyber security system has to identify each of these cyber threats as they evolve.

SUMMARY

An expert interface component can automatically connect a system user with a system support expert. A user interface module can present a threat-tracking graphical user interface and a query interface component integrated into the threat-tracking graphical user interface to a system user belonging to a client team to review a potential cyber threat and receive a query for assistance. The query interface component can allow the system user to digitally grab a visual data container displaying information and containing a data object. The query interface component can collect the visual data container from the threat-tracking graphical user interface into a collection window of the query interface component. A communication module provides an incident ticket containing the query and the visual data container to a system support expert at a remote platform.

These and other features of the design provided herein can be better understood with reference to the drawings, description, and claims, all of which form the disclosure of this patent application.

DRAWINGS

The drawings refer to some embodiments of the design provided herein in which:

FIG. 15 illustrates a block diagram of an embodiment of an incident report.

FIG. 17 illustrates a diagram of an embodiment of an example network being protected by the cyber threat defense system with a cyber threat appliance installed in the network.

Figure 1:
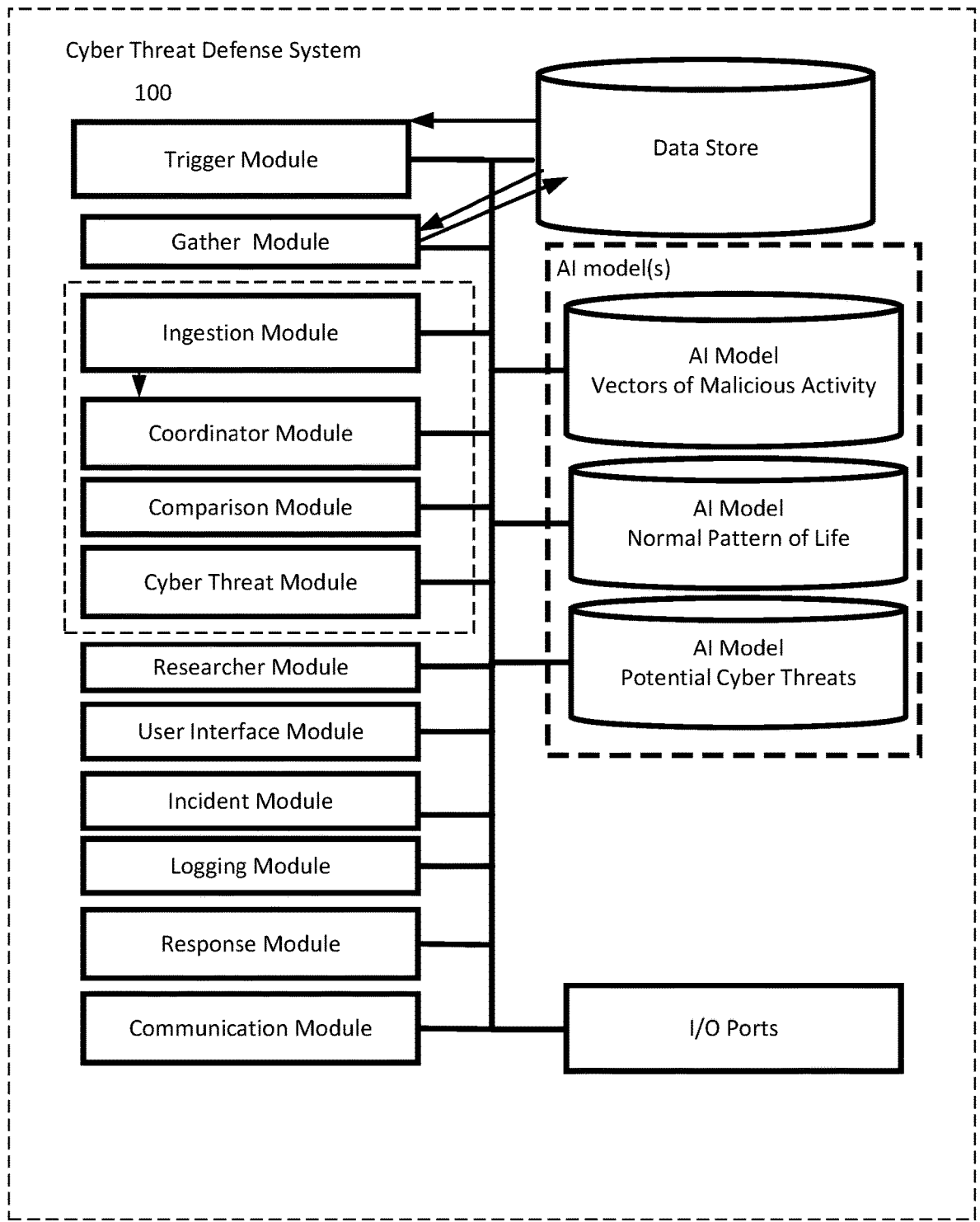
FIG. 1 illustrates a block diagram of an embodiment of a cyber threat defense system with a cyber threat module that references machine-learning models to identify cyber threats by identifying deviations from normal behavior.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the cyber threat defense system may use artificial intelligence to analyze cyber security threats. FIG. 1 illustrates a block diagram of an embodiment of a cyber threat defense system with a cyber threat module that references machine-learning models that are trained on the normal behavior of network activity and user activity associated with a network. The cyber threat module determines a threat risk parameter that factors in 'the likelihood that a chain of one or more unusual behaviors of email activity, network activity, and user activity under analysis fall outside of derived normal benign behavior;' and thus, are likely malicious behavior.

The cyber threat defense system 100 may protect against cyber security threats from an e-mail system or other communication system, as well as its network. The cyber threat defense system 100 may include components such as i) a trigger module, ii) a gather module, iii) a data store, iv) an ingestion module, v) a coordinator module, vi) a comparison module, vii) a cyber threat module, viii) a research module, ix) a user interface module, x) an incident module, xi) a logging module, xii) an autonomous response module, xiii) a communication module, xiv) at least one input or output (I/O) port to securely connect to other ports as required, xv) one or more machine-learning models such as a first Artificial Intelligence model trained on characteristics of vectors for malicious activity and related data, a second Artificial Intelligence model trained on known patterns of life, a third Artificial Intelligence model trained on potential cyber threats, and one or more Artificial Intelligence models each trained on different users, devices, system activities and interactions between entities in the system, and other aspects of the system, as well as xvi) other similar components in the cyber threat defense system.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the comparison module and the cyber threat module.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis. A feedback loop of cooperation occurs between the gather module, the ingestion module monitoring network and email activity, the comparison module to apply one or more models trained on different aspects of this process, and the cyber threat module to identify cyber threats based on comparisons by the comparison module. While an email module is mentioned, a similar module may be applied to other communication systems, such as text messaging and other possible vectors for malicious activity. Each hypothesis of typical threats can have various supporting points of data and other metrics associated with that possible threat, such as a human user insider attack, inappropriate network behavior, or email behavior or malicious software or malware attack, inappropriate network behavior, or email behavior. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherers may then filter or condense the mass of data down into the important or salient features of data. In an embodiment, the ingestion module and the coordinator module may be portions of the cyber threat module.

An ingestion module can be configured to collect probe data from a probe deployed to a network entity. The network entity represents at least one of a user and a network device interacting with the network. The probe data describes any activity executed by the network entity and administrated by a network administrator associated with the network. A network-administrated activity may be network activity, email activity, or other application activity. Further, the ingestion module may be divided into an email module and a network module. The ingestion module monitoring network entity activity may feed collected data to a coordinator module to correlate causal links between these activities to supply this input into the cyber threat module.

The cyber threat module may also use one or more machine-learning models trained on cyber threats in the network. The cyber threat module may reference the models that are trained on the normal behavior of user activity and network activity associated with the network. The cyber threat module can reference these various trained machine-learning models and data from the ingestion module and the trigger module. The cyber threat module can determine a threat risk parameter that factors in how the chain of unusual behaviors correlate to potential cyber threats and 'the likelihood that a chain of one or more unusual behaviors of the network activity and user activity under analysis fall outside of derived normal benign behavior;' and thus, is malicious behavior.

The one or more machine learning models can be self-learning models using unsupervised learning and trained on a normal behavior of different aspects of the system, for example, device activity and user activity associated with a network host, such as a website. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the combined data set from the coordinator module. The at least one machine-learning model is trained on a normal benign behavior of a network entity. The at least one machine uses a normal behavior benchmark describing parameters corresponding to a normal pattern of activity for that network entity. The comparison module can use the comparison to identify whether the network entity is in a breach state of the normal behavior benchmark.

The comparison module can be integrated with the cyber threat module. The cyber threat defense system 100 may also include one or more machine-learning models trained on gaining an understanding of a plurality of characteristics on a transmission and related data including classifying the properties of the transmission and its meta data. The cyber threat module can then determine, in accordance with the analyzed metrics and the moving benchmark of what is considered normal behavior, a cyber-threat risk parameter indicative of a likelihood of a cyber-threat.

The cyber threat defense system 100 may also include one or more machine learning models trained on gaining an understanding of a plurality of characteristics on a network host event and related data including classifying the properties of the network host event and its meta data.

The cyber threat module can generate a set of incident data describing an anomalous event by an entity, here representing a user or a device participating in the network. The cyber threat module can use the incident data to determine whether the anomalous event indicates a breach state representing a malicious incident or confidential data exposure. The cyber threat module can use the user interface and display module to present the incident data to a user analyst for review and remediation. Alternately, the cyber threat module can execute an autonomous analyst to use machine learning to determine whether the entity has entered a breach state and if so, remediate.

Alternately, the cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to a cyber threat.

The cyber threat defense system 100 may use multiple machine learning models. Each machine learning model may be trained on specific aspects of the normal pattern of life for the system such as devices, users, network traffic flow, outputs from one or more cyber security analysis tools analyzing the system, and others. One or more machine learning models may also be trained on characteristics and aspects of all manner of types of cyber threats. One or more machine learning models may also be trained by observing vectors for malicious activity, such as network activity or emails. One or more machine learning models may be trained by observing the activities of external hosts.

The cyber threat defense system 100 may supplement the data provided to the users and cyber professionals using a researcher module. The researcher module operates an artificial intelligence (AI) algorithm to assess whether the anomalous network activity has previously appeared in other published threat research or known lists of malicious files or internet addresses. The researcher module can consult internal threat databases or external public sources of threat data. The researcher module can collect an outside data set describing at least one of an action or a state related to the cyber threat present outside of the network from at least one data source outside the network.

The cyber threat defense system 100 can have a user interface module configured to generate a threat-tracking graphical user interface to display a visual representation of data from a network entity describing network activity containing a potential cyber threat. The threat-tracking graphical user interface can display one or more data objects of the breach state and the chain of relevant behavioral parameters identified by the cyber threat module. The threat tracking graphical user interface can have a network topology map, an action log, a connection data graph, a triaged incident list. The network topology map illustrates connections between network devices. The action log lists a sequence of actions by the network entity. The connection data graph may display a quantity or frequency of connections at a selected network node. The triaged incident list can highlight potential cyber threats. The user interface module can present the threat-tracking graphical user interface to a system user belonging to a client team to review the potential cyber threat.

The user interface module is configured to generate a query interface component integrated into the threat-tracking graphical user interface to receive a query for assistance from the system user. The threat-tracking graphical user interface is constructed such that information including lines of text, graphs, and other information displayable on this graphical user interface each represent a separate data object. The user interface module can store the data objects in a data container. The data container has, in addition to the data object, a data handle so that a system user can select, or "digitally" grab and collect the data container into the collection window. The system user can grab and collect the visual data containers using any one of multiple techniques. The system user can select the visual data container with a cursor device, copy the visual data container, and then paste the visual data container in the collection window. Alternately, the system user can "drag and drop" the visual data container. In a drag-and-drop input, the system user selects the visual data container with a cursor device, moves the selected visual data container to the collection window, and then releases the visual data container over the collection window.

In an embodiment, ask the expert user interface comes up as a pop up window from the threat-tracking graphical user interface and is integrated within the threat-tracking graphical user interface to drag and drop to collect information displayed on the threat-tracking graphical user interface. The pop up window when activated allows the system support expert at a remote location to analyze information being displayed on the threat-tracking graphical user interface along with the system user viewing the threat-tracking graphical user interface. The system securely communicates a query constructed from cybersecurity information in a multimedia format (for example, connection logs, graphical representations, triaged incidents, analyst comments, etc.) extracted from the threat-tracking graphical user interface of a cyber security platform to a knowledgeable party at a remote location from the platform but who can directly respond within the same graphical user interface of the cyber security platform. The communication tool is part of the cybersecurity platform's native user interface—it is familiar, easy to use and does not require accessing an external system like email or a website, keeping sensitive data within the platform.

The threat-tracking graphical user interface can receive a user input selecting the visual data container representing a data object of the visual representation. The visual data container can be a line of text, a portion of a graph, a node in a network topology map, a connection in the network topology map, or other visual representation from the threat-tracking graphical user interface. A query interface component integrated into the threat-tracking graphical user interface can generate a query for assistance, where the query interface component is configured to drag and drop information displayed on the threat-tracking graphical user interface as data objects into a collection window for the query interface component. The query interface component can receive a drag-and-drop input from the system user to move a copy of the data object to the query interface component. Note, the received drag-and-drop input of one or more data objects from information displayed on the threat-tracking graphical user interface acts to move a copy of the data objects into a collection window for the query interface component from the system user to the query interface component, where the data objects contain a literal copy of the data as opposed to a summarization of the data, so that the analyst responding can analyze the raw data to draw their own conclusions and make the correct recommendations.

The cyber threat defense system 100 can have an incident module configured to revert the copy of the data object to a set of portable code for conversion to a copy of the visual data container at an instance of the threat-tracking graphical user interface run on a remote platform by the system support expert. The incident module can generate an incident ticket containing a query for assistance from the system user regarding the cyber threat and a copy of the visual data container. The incident module can anonymize an incident ticket to remove any personally identifiable information. The incident module can encrypt an incident ticket to make the incident ticket unreadable until unlocked by the system support expert.

The cyber threat defense system 100 can have a communication module configured to provide the incident ticket to a system support expert at a remote platform from the threat-tracking graphical user interface for a response to the query. The communication module can deliver the incident ticket to a dead drop host for less-than-immediate but close to real time retrieval by the system support expert. This machine speed delay prevents an open connection between the two locations occurring at the same time which may be vulnerable to malicious manipulation. Alternately, the communication module can receive a poll for incident tickets from the remote platform. The communication module can target the system support expert for delivery of the incident ticket based on a query category for the query. The communication module can send an incident ticket containing a query regarding the cyber threat and a copy of the data object to the remote platform.

The communication module can receive the query response from the system support expert. The communication module can also receive a query report listing a series of queries from the system user and query responses from the system support expert for a report period. The incident module can open the incident ticket as a mirrored incident ticket to the client team. The communication module can then connect to an internal support expert responding to the incident ticket. The communication module can establish a secure multimedia channel between the threat-tracking graphical user interface and the system support expert at the remote platform. The secure multimedia channel provides for the exchange of audio, visual, or textual information, as well as for visual data containers from the threat-tracking graphical user interface. Further, as the secure multimedia channel is embedded within the cyber threat defense system, no valuable data is exposed to external communication systems. The multimedia communication channel is constructed as part of a native portion of user interface; and thus, does not require accessing an external communication system, such as email or a third party website, to securely exchange the audio, visual, and textual information with a platform used by the system support expert. The communication module can establish a secure reverse control channel with the system support expert to allow the system support expert to view and manipulate the threat-tracking graphical user interface while presented to the system user. The communication system is not in a mere chat format or a submitted text block (like a standard contact form) but rather the communication channel supports both multimedia and block text queries. This is a multimedia query system on a cybersecurity platform.

The cyber threat defense system 100 can have a logging module configured to maintain a query log within the cyber threat defense system for the client team listing previous incident queries to the system support expert from the client team. The logging module can store the incident ticket as an incident report for later review by subsequent system users. The logging module can export the incident report as a document. A system administrator can review an incident report for billing purposes based upon the frequency and extent of requested assistance. Other system users can use the incident report to review answers to previously asked questions they may also have.

The cyber threat defense system 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous response module, to cause one or more autonomous actions to be taken to contain the cyber threat, improves computing devices in the network and the email system by limiting an impact of the cyber threat from consuming unauthorized CPU cycles, memory space, and power consumption in the computing devices via responding to the cyber threat without waiting for some human intervention.

The autonomous response module can interact with the cyber threat module to automatically respond to any identified cyber threats. The cyber threat module may analyze the input data from any probes at a network entity to identify any cyber threats. The cyber threat module may generate a threat risk parameter listing a set of values describing aspects of a potential cyber threat. The autonomous response module is configured to compare the threat risk parameter to a benchmark matrix having a set of benchmark scores to determine an autonomous response. The autonomous response module is configured to identify at least one autonomous response to take in response to the cyber threat based on the threat risk parameter. The autonomous response can be, for example, reducing permissions of the network entity or disabling a user account of the network entity.

A communication module can send an alert of the cyber threat with a suggested response to the cyber threat to an internal system administrator.

The cyber threat defense system 100 may be hosted on a device, on one or more servers, or in its own cyber threat appliance platform.

Figure 2:
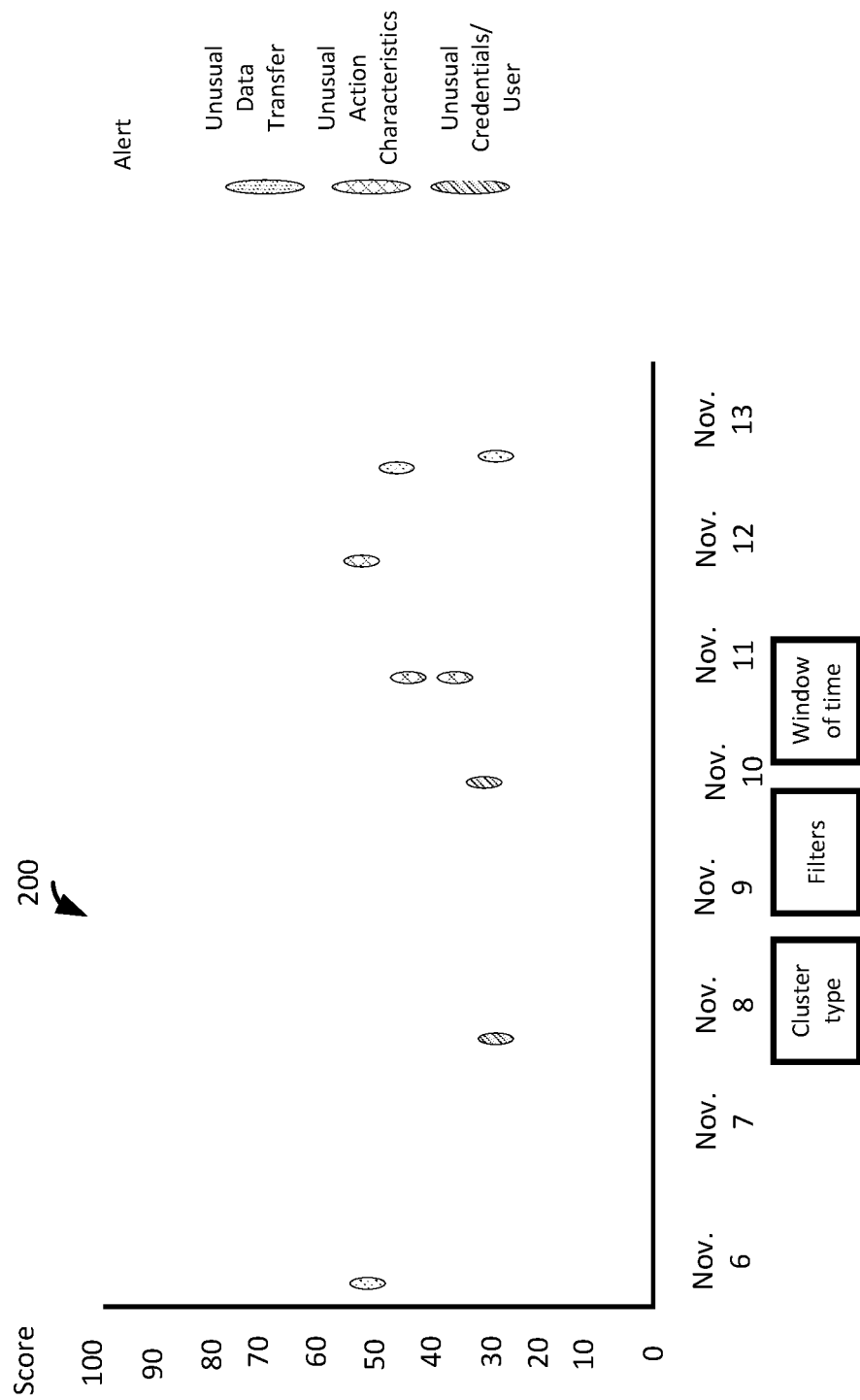
FIG. 2 illustrates a block diagram of an embodiment of an example chain of unusual behavior in connection with the rest of the network under analysis.

FIG. 2 illustrates a block diagram of an embodiment of an example chain of unusual behavior for the network entity in connection with the rest of the network under analysis.

The user interface can display a graph 200 of an example chain of unusual behavior for a network entity in connection with the rest of the network under analysis. An ingestion module can tie the alerts and events from the email realm to the alerts and events from the network realm.

The network & email module can tie the alerts and events from the email realm to the alerts and events from the network realm.

The cyber threat module cooperates with one or more machine-learning models. The one or more machine-learning models are trained and otherwise configured with mathematical algorithms to infer, for the cyber threat analysis, 'what is possibly happening with the chain of distinct alerts and/or events, which came from the unusual pattern,' and then assign a threat risk associated with that distinct item of the chain of alerts and/or events forming the unusual pattern. This is 'a behavioral pattern analysis' of what are the unusual behaviors of the network entity, such as a network, a system, a device, a user, or an email, under analysis by the cyber threat module and the machine-learning models. The cyber defense system uses unusual behavior deviating from the normal behavior and then builds a chain of unusual behavior and the causal links between the chain of unusual behavior to detect cyber threats. An example behavioral pattern analysis of what are the unusual behaviors may be as follows. The unusual pattern may be determined by filtering out what activities, events, or alerts that fall within the window of what is the normal pattern of life for that network entity under analysis. Then the pattern of the behavior of the activities, events, or alerts that are left, after the filtering, can be analyzed to determine whether that pattern is indicative of a behavior of a malicious actor, such as a human, a program, an email, or other threat. The defense system can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The defense system detects a chain of anomalous behavior of unusual data transfers three times, unusual characteristics in network actions in the monitored system three times which seem to have some causal link to the unusual data transfers. Likewise, twice unusual credentials tried unusual behavior of trying to access to sensitive areas or malicious IP addresses and the user associated with the unusual credentials trying unusual behavior has a causal link to at least one of those three emails with unusual characteristics. When the behavioral pattern analysis of any individual behavior or of the chain as a group is believed to be indicative of a malicious threat, then a score of how confident the defense system is in this assessment of identifying whether the unusual pattern was caused by a malicious actor is created. Next, also assigned is a threat level parameter (e.g. score or probability) indicative of what level of threat does this malicious actor pose to the system. Lastly, the cyber threat defense system is configurable in its user interface of the defense system on what type of automatic response actions, if any, the defense system may take when for different types of cyber threats that are equal to or above a configurable level of threat posed by this malicious actor.

The cyber threat module may chain the individual alerts and events that form the unusual pattern into a distinct item for cyber threat analysis of that chain of distinct alerts or events. The cyber threat module may reference the one or more machine-learning models trained on e-mail threats to identify similar characteristics from the individual alerts or events forming the distinct item made up of the chain of alerts or events forming the unusual pattern.

One or more machine-learning models may also be trained on characteristics and aspects of all manner of types of cyber threats to analyze the threat risk associated with the chain or cluster of alerts or events forming the unusual pattern. The machine-learning technology, using advanced mathematics, can detect previously unidentified threats, without relying on prescribed rules, and automatically defend networks.

The models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived, each producing time series data for the given metric.

The detectors in the cyber threat module including the network module and email module components can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the emails, iii) coming from specific devices and/or users within a system, etc.

At its core, the cyber threat defense system mathematically characterizes what constitutes 'normal' behavior based on the analysis of a large number/set of different measures of a devices network behavior. The cyber threat defense system can build a sophisticated 'pattern of life'—that understands what represents normality for every person, device, email activity, and network activity in the system being protected by the cyber threat defense system.

As discussed, each machine-learning model may be trained on specific aspects of the normal pattern of life for the system such as devices, users, network traffic flow, outputs from one or more cyber security analysis tools analyzing the system, email contact associations for each user, email characteristics, and others. The one or more machine-learning models may use at least unsupervised learning algorithms to establish what is the normal pattern of life for the system. The machine-learning models can train on both i) the historical normal distribution of alerts and events for that system and ii) a normal distribution information from similar peer systems to establish the normal pattern of life of the behavior of alerts or events for that system. Another set of machine-learning models train on characteristics of emails and the activities and behavior of its email users to establish a normal for these.

The models can leverage at least two different approaches to detecting anomalies: such as comparing each system's behavior to its own history and comparing that system to its peers' history or such as comparing an email to both characteristics of emails and the activities and behavior of its email users. This multiple source comparison allows the models to avoid learning existing bad behavior as 'a normal behavior', because compromised entities, such as devices, users, components, emails will exhibit behavior different to their immediate peers.

In addition, the one or more machine-learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts or events, which allows the detection of previously unidentified cyber threats compared to finding cyber threats with merely predefined descriptive objects or signatures. Thus, increasingly intelligent malicious cyber threats, picking and choosing when they take their actions in order to generate low level alerts and event, will still be detected, even though they have not yet been identified by other methods of cyber analysis. These intelligent malicious cyber threats can include malware, spyware, key loggers, malicious links in an email, malicious attachments in an email, and others as well as nefarious internal information technology staff who know intimately how to not set off any high-level alerts or events.

The plotting and comparison are a way to filter out what is normal for that system and then be able to focus the analysis on what is abnormal or unusual for that system. Then for each hypothesis of what could be happening with the chain of unusual events or alerts, the gather module may gather additional metrics from the data store including the pool of metrics originally considered 'normal behavior' to support or refute each possible hypothesis of what could be happening with this chain of unusual behavior under analysis.

Note, each of the individual alerts or events in a chain of alerts or events that form the unusual pattern can indicate subtle abnormal behavior. Thus, each alert or event can have a low threat risk associated with that individual alert or event. However, when analyzed as a distinct chain or grouping of alerts or events behavior forming the chain of unusual pattern by the one or more machine-learning models, that distinct chain of alerts or events can be determined to now have a much higher threat risk than any of the individual and/or events in the chain.

In addition, modern cyber attacks can be of such severity and speed that a human response cannot happen quickly enough. Thanks to these self-learning advances, a machine may uncover these emerging threats and deploy appropriate, real-time responses to fight back against the most serious cyber threats.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine, email, and human activity behaviorally, at and after the point of compromise, in order to predict and catch today's increasingly sophisticated cyber-attack vectors. It is thus possible to computationally establish what is normal, in order to then detect what is abnormal. In addition, the machine-learning constantly revisits assumptions about behavior, using probabilistic mathematics. The cyber threat defense system's unsupervised machine-learning methods do not require training data with pre-defined labels. Instead, unsupervised machine-learning methods may identify key patterns and trends in the data, without the need for human input.

The user interface and output module may also project the individual alerts and/or events forming the chain of behavior onto the user interface with at least three-dimensions of i) a horizontal axis of a window of time, ii) a vertical axis of a scale indicative of the threat risk assigned for each alert and/or event in the chain and a third dimension of iii) a different color for the similar characteristics shared among the individual alerts and events forming the distinct item of the chain. The different color may be red, blue, yellow, or others. For gray scale, the user interface may use different shades of gray, black, and white with potentially different hashing patterns. These similarities of events or alerts in the chain may be, for example, alerts or events are coming from same device, same user credentials, same group, same source identifiers, same destination Internet Protocol addresses, same types of data transfers, same type of unusual activity, same type of alerts, same rare connection being made, same type of events, or others, so that a human can visually see what spatially and content-wise is making up a particular chain rather than merely viewing a textual log of data. Note, once the human mind visually sees the projected pattern and corresponding data, then the human can ultimately decide if a cyber threat is posed. Again, the at least three-dimensional projection helps a human synthesize this information more easily. The visualization onto the user interface allows a human to see data that supports or refutes why the cyber threat defense system thinks these aggregated alerts or events could be potentially malicious. Also, instead of generating the simple binary outputs 'malicious' or 'benign,' the cyber threat defense system's mathematical algorithms produce outputs that indicate differing degrees of potential compromise.

Defense System

Figure 3:
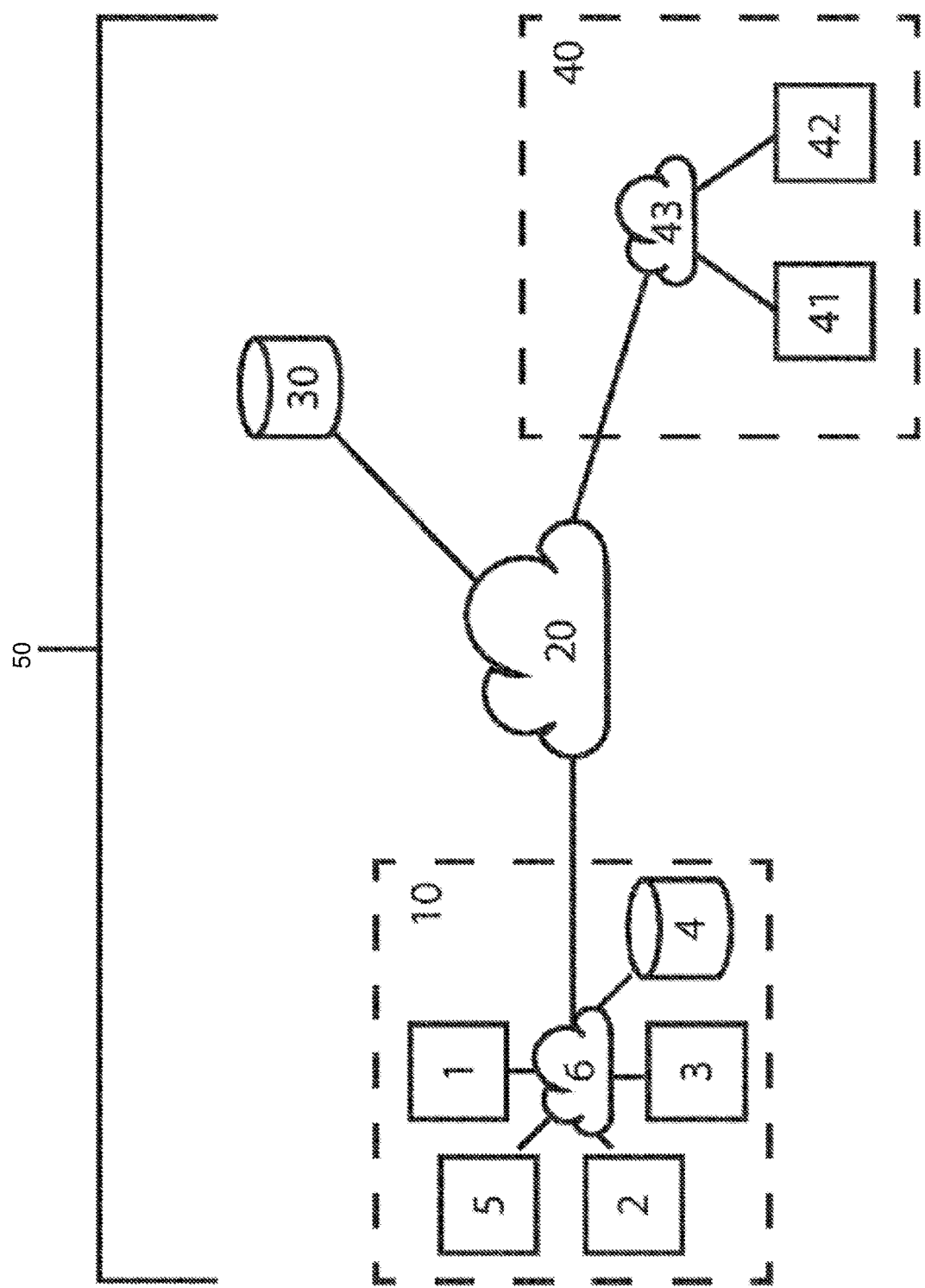
FIG. 3 illustrates a diagram of an embodiment of an example cyber threat defense system protecting an example network.

FIG. 3 illustrates an example cyber threat defense system protecting an example network. The example network FIG. 3 illustrates a network of computer systems 50 using a threat detection system. The system depicted by FIG. 3 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device (MFD) 5 that provides printing, scanning and facsimile functionalities to each of the computers 1, 2, 3. All of the devices within the first computer system 10 are communicatively coupled via a local area network (LAN) 6. Consequently, all the computers 1, 2, 3 can access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 3.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network. Computer 2 is active from about 8:30 AM until 6 PM and usually communicates with machines in the company's U.K. office in second computer system 40 between 9.30 AM and midday. The same employee virtually never accesses the employee time sheets, very rarely connects to the company's Atlanta network, and has no dealings in South-East Asia. The threat detection system takes all the information that is available relating to this employee to establish a 'pattern of life' for that person, which is dynamically updated as more information is gathered. The 'normal' model is used as a moving benchmark, allowing the system to spot behavior on a system that seems to fall outside of this normal pattern of life and to flag this behavior as anomalous, requiring further investigation.

The threat detection system is built to deal with the fact that today's attackers are getting stealthier. An attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, to defeat a relatively-simple policing process. These sophisticated attackers look for activity that is not directly associated with the user's input. As an Advanced Persistent Threat (APT) attack typically has very long mission windows of weeks, months, or years, such processor cycles can be stolen so infrequently that they do not impact machine performance. However cloaked and sophisticated the attack is, the attack will always leave a measurable delta, even if extremely slight, in typical machine behavior, between pre and post compromise. This behavioral delta can be observed and acted on with the form of Bayesian mathematical analysis used by the threat detection system installed on the computer 1.

Figure 4:
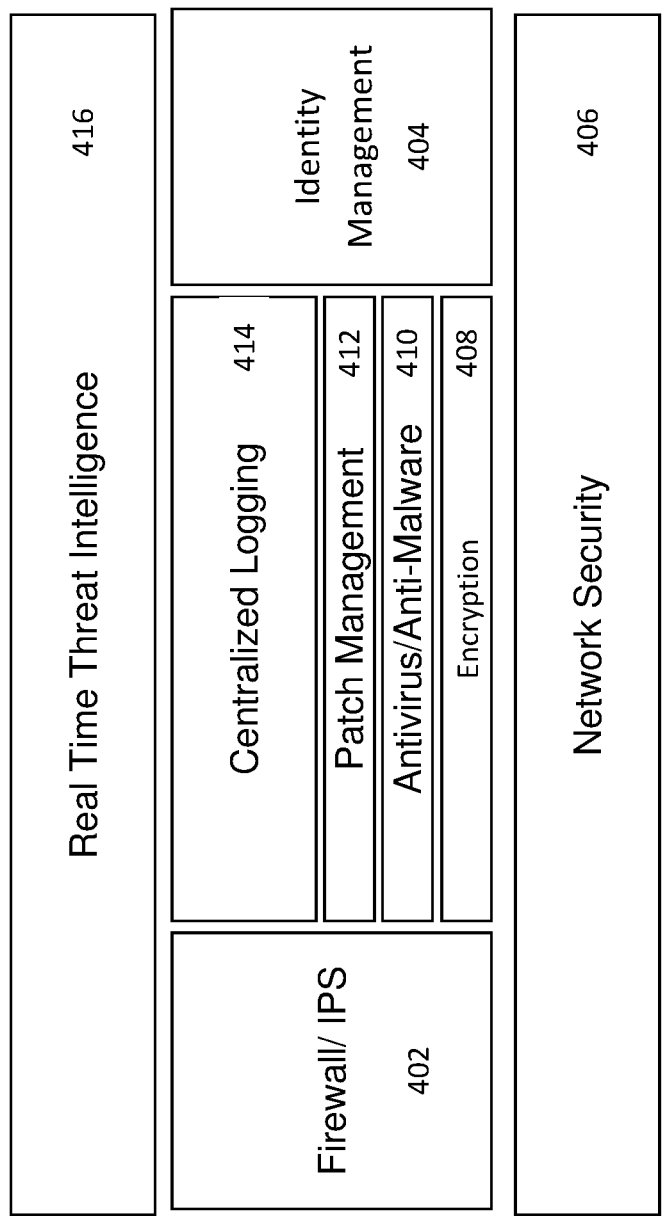
FIG. 4 illustrates in a block diagram of an embodiment of the integration of the threat detection system with other network protections.

FIG. 4 illustrates in a block diagram the integration of the threat detection system with other network protections. A network generally has a firewall 402 as a first line of defense. The firewall 402 analyzes packet headers on incoming network data packets to enforce network policy. The firewall 402 may be integrated with an intrusion prevention system (IPS) to analyze the packet header and payload for whole events. Internally, an identity management module 404 controls the access for the users of the network.

A network security module 406 can enforce practices and policies for the network as determined by a network administrator. An encryption module 408 can encrypt communications within the network, as well as encrypting and decrypting communications between network entities and outside entities. An anti-virus or anti-malware module 410 may search packets for known viruses and malware. A patch management module 412 can ensure that security applications within the network have applied the most up-to-date patches. A centralized logging module 414 may track communications both internal to and interactive with the network. The threat detection system can act as real time threat intelligence 416 for the network. The real time threat intelligence may interact with the other defense components to protect the network.

The cyber defense self-learning platform uses machine-learning technology. The machine-learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system may self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. The approach may thus computationally establish what is normal, in order to then detect what is abnormal.

This intelligent system may make value judgments and carry out higher value, more thoughtful tasks. Machine-learning requires complex algorithms to be devised and an overarching framework to interpret the results produced. However, when applied correctly these approaches can facilitate machines to make logical, probability-based decisions and undertake thoughtful tasks.

Advanced machine-learning is at the forefront of the fight against automated and human-driven cyber-threats, overcoming the limitations of rules and signature-based approaches. For example, the machine-learning learns what is normal within a network without depending upon knowledge of previous attacks. The machine-learning thrives on the scale, complexity, and diversity of modern businesses, where every device and person is slightly different. The machine-learning turns the innovation of attackers against them, so that any unusual activity is visible. The machine-learning constantly revisits assumptions about behavior, using probabilistic mathematics. The machine-learning is always up to date and not reliant on human input. Utilizing machine-learning in cyber security technology is difficult, but when correctly implemented it is extremely powerful. The machine-learning means that previously unidentified threats can be detected, even when their manifestations fail to trigger any rule set or signature. Instead, machine-learning allows the system to analyze large sets of data and learn a 'pattern of life' for what it sees.

Figure 5:
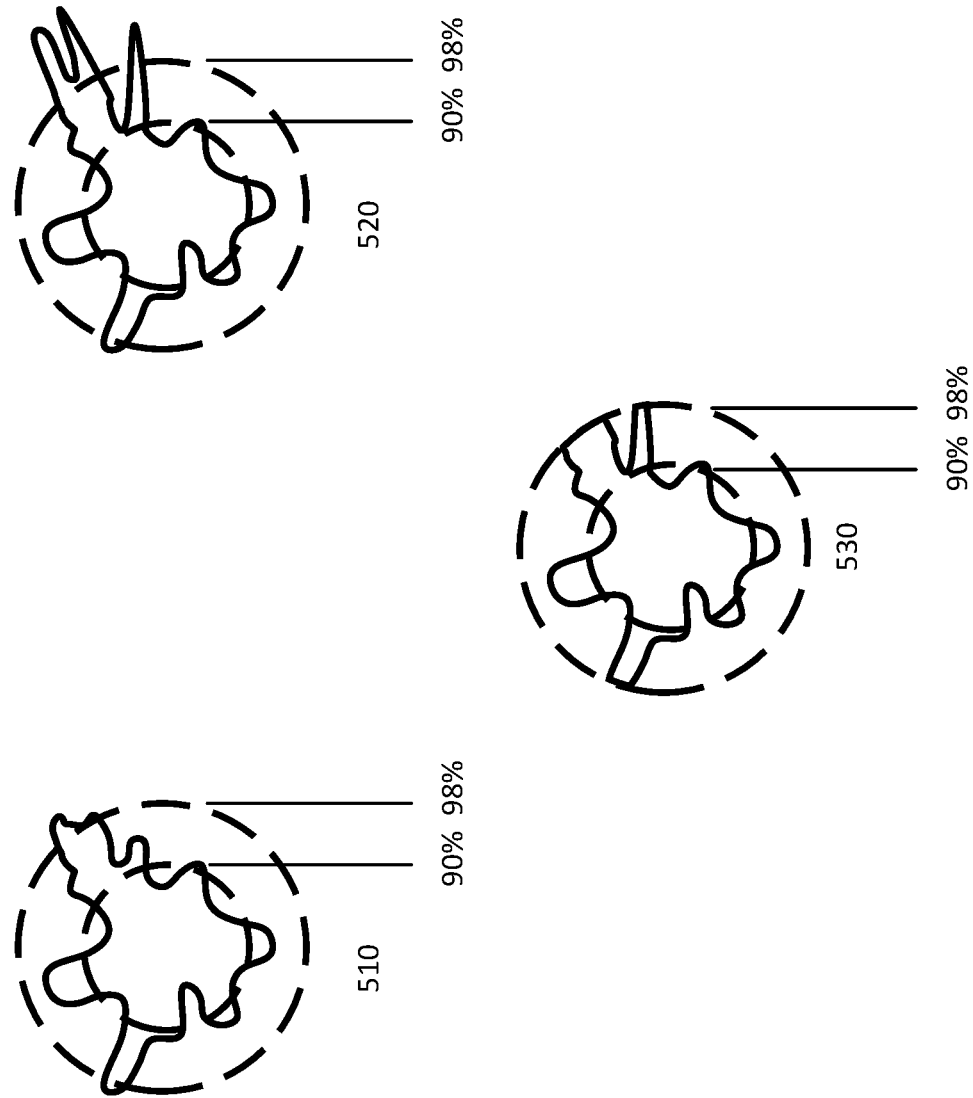
FIG. 5 illustrates a diagram of an embodiment of an application of a cyber threat defense system using advanced machine-learning to detect anomalous behavior.

FIG. 5 illustrates an application of a cyber threat defense system using advanced machine-learning to detect anomalous behavior. A normal pattern of behavior 510 may describe a set of user or device behavior within a threshold level of occurrence, such as a 98% probability of occurrence based on prior behavior. An anomalous activity 520 may describe a set of user or device behavior that is above the threshold level of occurrence. The cyber threat defense system can initiate an autonomous response 530 to counteract the anomalous activity, leaving the normal behavior unaffected.

Machine-learning can approximate some human capabilities to machines. Machine-learning can approximate thought by using past information and insights to form judgments. Machine-learning can act in real time so that the system processes information as it goes. Machine-learning can self-improve by constantly challenging and adapting the model's machine-learning understanding based on new information.

New unsupervised machine-learning therefore allows computers to recognize evolving threats, without prior warning or supervision.

Unsupervised Machine-Learning

Unsupervised learning works things out without pre-defined labels. This allows the system to handle the unexpected and embrace uncertainty. The system does not always know the characteristics of the target of the search but can independently classify data and detect compelling patterns.

The cyber threat defense system's unsupervised machine-learning methods do not require training data with pre-defined labels. Instead, unsupervised machine-learning methods can identify key patterns and trends in the data, without the need for human input. Unsupervised learning provides the advantage of allowing computers to go beyond what their programmers already know and discover previously unknown relationships.

The cyber threat defense system uses unique implementations of unsupervised machine-learning algorithms to analyze network data at scale, intelligently handle the unexpected, and embrace uncertainty. Instead of relying on knowledge of past threats to be able to know what to look for, the cyber threat defense system may independently classify data and detect compelling patterns that define what may be considered to be normal behavior. Any new behaviors that deviate from this notion of 'normality' may indicate threat or compromise. The impact of the cyber threat defense system's unsupervised machine-learning on cyber security is transformative. Threats from within, which would otherwise go undetected, can be spotted, highlighted, contextually prioritized, and isolated using these algorithms. The application of machine-learning has the potential to provide total network visibility and far greater detection levels, ensuring that networks have an internal defense mechanism. Machine-learning has the capability to learn when to execute automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine-learning is extremely complex and difficult to get right. Robust, dependable algorithms are developed, with a scalability that enables their successful application to real-world environments.

Overview

In an embodiment, the cyber threat defense system's probabilistic approach to cyber security is based on a Bayesian framework. This allows the cyber threat defense system to integrate a huge number of weak indicators of potentially anomalous network behavior to produce a single clear measure of how likely a network device is to be compromised. This probabilistic mathematical approach provides an ability to understand important information amid the noise of the network, even when the target of a search is unknown.

Ranking Threats

Crucially, the cyber threat defense system's approach accounts for the inevitable ambiguities that exist in data, distinguishing between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner, prioritizing those that most urgently require action and simultaneously removing the problem of numerous false positives associated with a rule-based approach.

On a core level, the cyber threat defense system mathematically characterizes what constitutes 'normal' behavior based on the analysis of a large number of different measures of network behavior by a device. Such network behavior may include server access, data access, timings of events, credential use, domain name server (DNS) requests, and other similar parameters. Each measure of network behavior is then monitored in real time to detect anomalous behaviors.

Clustering

To be able to properly model what should be considered as normal for a device, the behavior of the device must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix-based clustering, density based clustering, and hierarchical clustering techniques. The resulting clusters are then used to inform the modeling of the normative behaviors of individual devices. Clustering analyzes behavior in the context of other similar devices on the network. Clustering algorithms identify naturally occurring groupings of devices, which is impossible to do manually. Further, the cyber threat defense system may simultaneously run multiple different clustering methods to inform the models.

The inoculation module may also use clustering to identify which devices to send an inoculation notice. The inoculation module may select devices that have similar characteristics relevant to the anomalous event.

Network Topology

Any cyber threat detection system must also recognize that a network is far more than the sum of its individual parts, with much of its meaning contained in the relationships among its different entities. Plus, any cyber threat defense system must further recognize that complex threats can often induce subtle changes in this network structure. To capture such threats, the cyber threat defense system employs several different mathematical methods in order to be able to model multiple facets of a network topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise local area network (LAN), wide area network (WAN) and Cloud is difficult because both input and output can contain many interrelated features, such as protocols, source and destination machines, log changes, rule triggers, and others. Learning a sparse and consistent structured predictive function is crucial to avoid over fitting.

In this context, the cyber threat defense system has employed a cutting edge large-scale computational approach to learn sparse structure in models of network behavior and connectivity based on applying L1-regularization techniques, such as a Least Absolute Shrinkage and Selection Operator (LASSO) method. This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models can constantly adapt themselves, in a computationally efficient manner, as new information becomes available to the system. The mathematical models continually recalculate threat levels in the light of new evidence, identifying changing attack behaviors where conventional signature-based methods fail.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that can identify subtle variations in machine events within a computer networks behavioral history that may indicate cyber-threat or compromise.

The cyber threat defense system uses mathematical analysis and machine-learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine-learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but rather are flagged by the automated system and ranked in terms of their significance.

Machine-learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Figure 6:
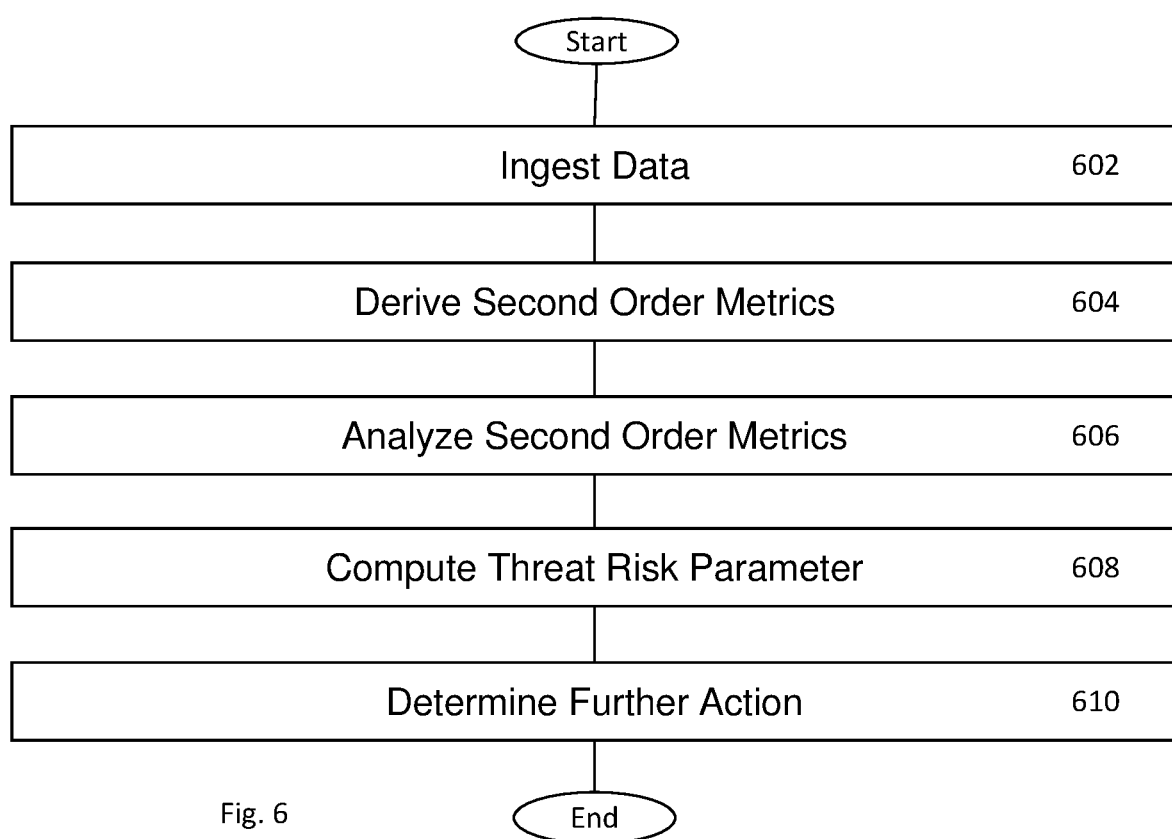
FIG. 6 illustrates a flowchart of an embodiment of a method for modeling human activity, machine activity, or other activity.

FIG. 6 illustrates a flowchart of an embodiment of a method for modeling human, machine or other activity. The cyber threat defense system initially ingests data from multiple sources (Block 602). The raw data sources include, but are not limited to raw network Internet Protocol (IP) traffic captured from an IP or other network Test Access Points (TAP) or Switched Port Analyzer (SPAN) port; machine generated log files; building access ("swipe card") systems; IP or non-IP data flowing over an Industrial Control System (ICS) distributed network; individual machine, peripheral or component power usage; telecommunication signal strength; or machine level performance data taken from on-host sources, such as central processing unit (CPU) usage, memory usage, disk usage, disk free space, network usage, and others.

The cyber threat defense system derives second order metrics from that raw data (Block 604). From these raw sources of data, multiple metrics can be derived, each producing time series data for the given metric. The data are bucketed into individual time slices. For example, the number observed could be counted per 1 second, per 10 seconds or per 60 seconds. These buckets can be combined at a later stage where required to provide longer range values for any multiple of the chosen internal size. For example, if the underlying time slice chosen is 60 seconds long, and thus, each metric time series stores a single value for the metric every 60 seconds, then any new time series data of a fixed multiple of 60 seconds (such as 120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, the cyber threat defense system commonly obtains multiple metrics relating to a wide range of potential threats. Communications from components in the network contacting known suspect domains.

The actual specific metrics used are largely irrelevant to the Bayesian probabilistic system, as long as a metric is selected. Metrics derived from network traffic could include data such as the number of bytes of data entering or leaving a networked device per time interval, file access, the commonality or rarity of a communications process, an invalid secure-sockets layer (SSL) certification, a failed authorization attempt, or email access patterns.

In the case where transmission control protocol (TCP), user datagram protocol (UDP), or other Transport Layer IP protocols are used over the IP network, and in cases where alternative Internet Layer protocols are used, such as Internet Control Message Protocol (ICMP) or Internet Group Message Protocol (IGMP), knowledge of the structure of the protocol in use and basic packet header analysis can be utilized to generate further metrics. Such further metrics may include the number of multicasts per time interval originating from a networked device and intended to reach publicly addressable IP ranges, the number of internal link-local IP Broadcast requests originating from a networked device, the size of the packet payload data, or the number of individual TCP connections made by a device, or data transferred by a device, either as a combined total across all destinations or to any definable target network range, such as a single target machine or a specific network range.

In the case of IP traffic, where the Application Layer protocol can be determined and analyzed, further types of time series metric can be defined. These time series metrics may include, for example, the number of DNS requests a networked device generates per time interval, again either to any definable target network range or in total; the number of Simple Mail Transfer Protocol (SMTP), Post Office Protocol (POP) or Internet Message Access Protocol (IMAP) logins or login failures a machine generates per time interval; the number of Lightweight Directory Access Protocol (LDAP) logins or login failures generated; data transferred via file sharing protocols such as Server Message Block (SMB), SMB2, File Transfer Protocol (FTP), or others; or logins to Microsoft Windows Active Directory, Secure Shell (SSH) or Local Logins to Linux or Unix-like systems, or other authenticated systems such as Kerberos.

The raw data required to obtain these metrics may be collected via a passive fiber or copper connection to the networks internal switch gear, from virtual switching implementations, cloud-based systems, or communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data sets are extremely sparse, with most data points equal to 0. Examples would be employee's using swipe cards to access a building or part of a building, or user's logging into their workstation, authenticated by Microsoft Windows Active Directory Server, which is typically performed a small number of times per day. Other time series data sets are much more populated, such as, the size of data moving to or from an always-on Web Server, the Web Servers CPU utilization, or the power usage of a photocopier.

Regardless of the type of data, such time series data sets, whether originally produced as the result of explicit human behavior or an automated computer or other system to exhibit periodicity, have the tendency for various patterns within the data to recur at approximately regular intervals. Furthermore, such data may have many distinct but independent regular time periods apparent within the time series.

Detectors carry out analysis of the second order metrics (Block 606). Detectors are discrete mathematical models that implement a specific mathematical method against different sets of variables with the target network. For example, Hidden Markov Models (HMM) may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and/or computers. These attributes may be value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

The threat detection system computes a threat risk parameter indicative of a likelihood of there being a threat using automated adaptive periodicity detection mapped onto observed behavioral pattern-of-life analysis (Block 608). This deduces that a threat over time exists from a collected set of attributes that themselves have shown deviation from normative collective or individual behavior. The automated adaptive periodicity detection uses the period of time the Bayesian probabilistic has computed to be most relevant within the observed network or machines. Furthermore, the pattern of life analysis identifies how a human or machine behaves over time, such as when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine-learning or Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of, for example, a laptop. If the attack escalates, the cyber threat defense system may ultimately quarantine a device to prevent wider harm to an organization.

In order to improve the accuracy of the system, a check can be carried out in order to compare current behavior of a user with associated users, such as users within a single office. For example, if there is an unexpectedly low level of activity from a user, this may not be due to unusual activity from the user, but rather a factor affecting the office as a whole. Various other factors can be considered in order to assess whether abnormal behavior is actually indicative of a threat.

Finally, the cyber threat defense system determines, based on the threat risk parameter, as to whether further action need be taken regarding the threat (Block 610). A human operator may make this determination after being presented with a probability of there being a threat. Alternately, an algorithm may make the determination, such as by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection can scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network, and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured input/output problems, such as the observation of packet traffic and host activity within a distributed digital enterprise, where both input and output can contain tens of thousands to millions of interrelated features (data transport, host-web-client dialogue, log change and rule trigger, etc.), learning a sparse and consistent structured predictive function is challenged by a lack of normal distribution. To overcome this, the threat detection system comprise a data structure that decides on a rolling continuum rather than a stepwise method in which recurring time cycles, such as the working day, shift patterns, and other routines are dynamically assigned, thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

Figure 7:
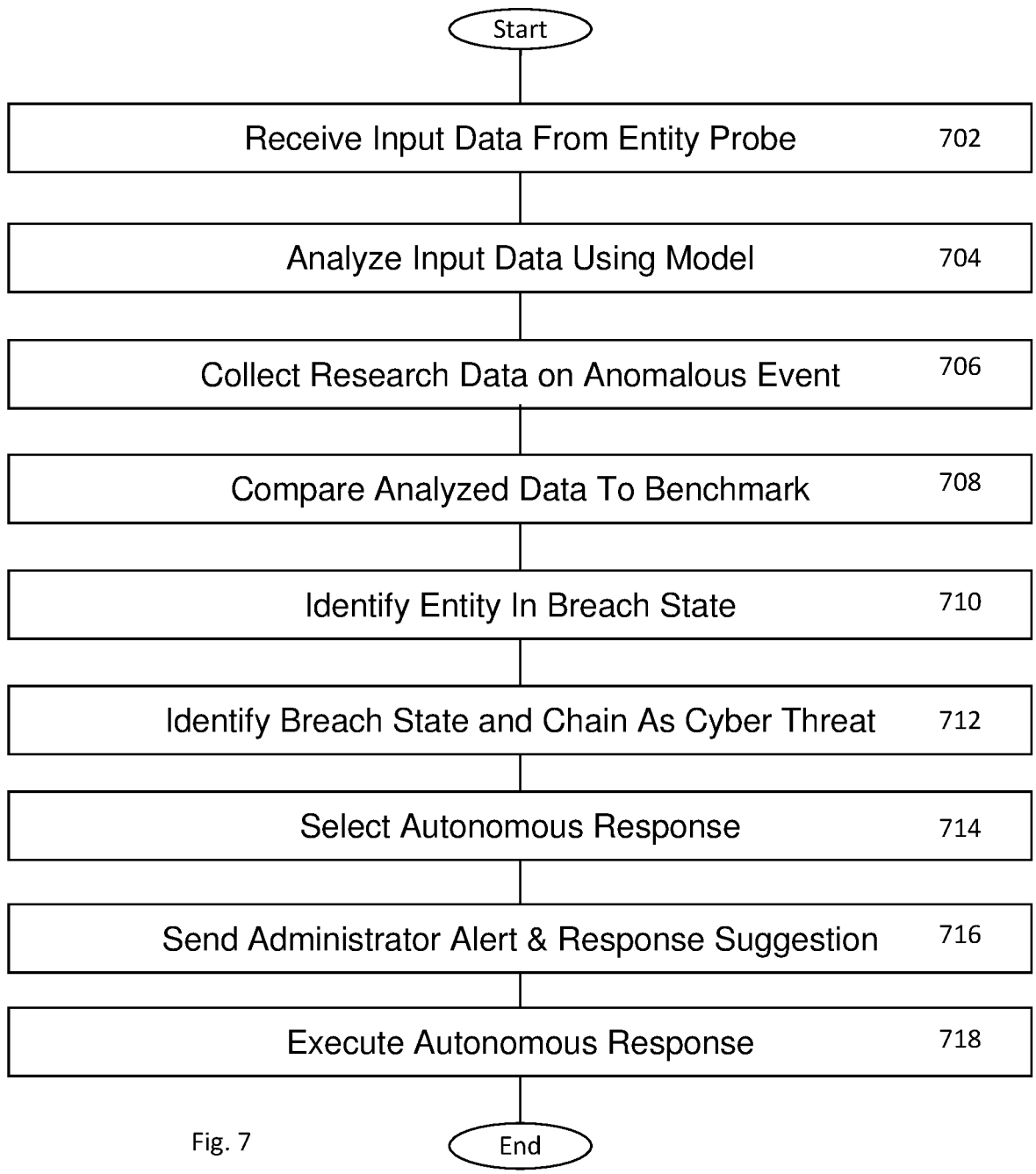
FIG. 7 illustrates a flowchart of an embodiment of a method for identifying a cyber threat.

Once the cyber threat has been identified, the cyber threat defense system can perform an autonomous response. FIG. 7 illustrates a flowchart of an embodiment of a method for developing an inoculation record based on the detection of an anomalous event. The cyber threat defense system can receive, via at least one input port, input data from a probe monitoring a network entity on a network (Block 702). The network entity can represent at least one of a user and a device associated with a network. The cyber threat defense system has a cyber threat module configured to analyze the input data using at least one machine-learning model to spot behavior on the network deviating from a normal benign behavior of that network entity (Block 704). The at least one machine-learning model is trained on generic normal benign behavior of a generic network entity using a normal behavior benchmark describing parameters corresponding to a normal pattern of activity for that network entity. The cyber threat defense system has a research module configured to collect an outside data set describing at least one of an outside action and an outside state related to the input data from at least one data source outside the network (Block 706). The cyber threat defense system has a comparison module that compares the input data to the at least one machine-learning model to spot behavior on the network deviating from a normal benign behavior of that network entity (Block 708). The comparison module can identify whether the network entity is in a breach state of the normal behavior benchmark (Block 710). The cyber threat module can identify whether the breach state and a chain of relevant behavioral parameters deviating from the normal benign behavior of that network entity correspond to a cyber threat (Block 712).

The cyber threat defense system can use an autonomous response module configured to select an autonomous response to take in response to the cyber threat (Block 714). The autonomous response can be, for example, reducing permissions of the network entity or disabling a user account of the network entity. The autonomous response module can send an alert of the cyber threat with a suggested response to the cyber threat to an internal system administrator (Block 716). The autonomous response module can execute the autonomous response in response to the cyber threat (Block 718).

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

"Ask-the-Expert" Component

In an embodiment, an 'ask the expert' secure messaging platform integrated into the cyber defense platform can create an instant communication channel directly between the system user on a local machine and an expert in that subject area on a backend platform. This platform allows inexperienced security analysts to review their investigations, assumptions, and conclusions with an expert. The platform presents system user's questions alongside the rich original data being analyzed, without risking accidental disclosure of private information, such as by email. The platform reduces overhead by automatically maintaining security by retaining sensitive information within a threat-tracking graphical user interface and not requiring the execution of an additional email or communications process. Further, the platform minimizes the amount of CPU cycles, memory space, and power consumed in operating the threat-tracking graphical user interface while communicating with other users or locating external sources for assistance.

The expert interface component can converge text messaging, voice, video and data system implemented in the cyber threat defense system platform. This expert interface component allows for an operator of the platform to package questions and gain advice from an expert without ever leaving the platform or removing potentially sensitive information from the platform.

The expert interface component allows for messaging or chat to explain a query to be packaged up with the actual data that an operator is investigating. All messages that are optionally exported out of the cyber threat platform to an external expert are transmitted with end-to-end encryption and authentication to an expert operations-center in an appropriate global time-zone. The resulting incident ticket is accessed securely by an authorized system support expert able to remotely connect to the customer's cyber defense deployment and view the suggested data alongside the message, which may be textual, voice, or video.

The information is securely exchanged via at least two mechanisms. The information in the communication is encrypted end-to-end, with an encryption option for data obfuscation, if required. Additionally, the communication channel is self-contained within the graphical user interface platform, meaning that a user does not need to send the communication (and potentially sensitive data) via email but rather the remote 'expert' who answers can do so within the same platform.

The system support expert can interact with the cyber defense deployment to investigate the suggested data as well as broader data within the platform. The support expert can use a secure reverse control channel to configure the cyber defense platform to assist the system user. The system support expert can tag and model interesting devices, users, or behaviors in the cyber defense platform. The system support expert can activate, deactivate, and customize autonomous response actions within the platform to urgently defend the system user's organization. The system support expert can respond with messages to the original system user to explain an answer, to direct attention to appropriate data, or to ask follow up questions.

For example, the expert interface component may be used by a system user who is investigating the unusual behavior of a video conferencing system that is active on the network even when the system is not meant to be in use. The system user has not worked with a potentially hacked videoconferencing unit before and asks for assistance in reviewing the system user's assumptions and conclusions from a system support expert. A system support expert is immediately able to review the situation, confirm that an attack is in progress, and review the autonomous defense posture to ensure suitability to protect the organization. The system support expert prepares a response to the operator and transmits that response. The system user may be away from their desk and receives the message via a secure connection from the cyber threat defense system to the mobile phone application on their smartphone. The system user can then arrange for a digital clean-up of the videoconferencing unit at any point in future, as the risk has been mitigated.

Figure 8:
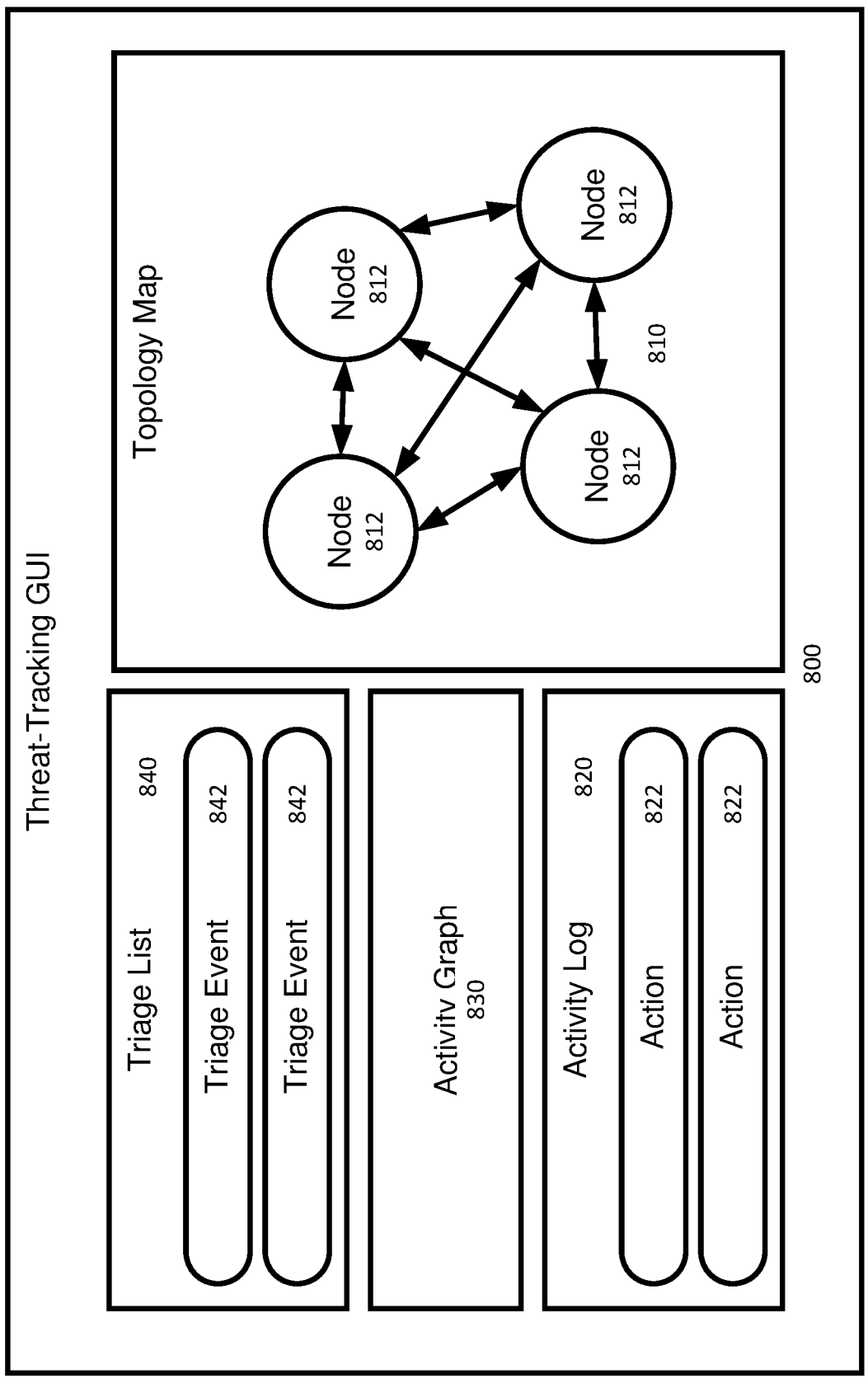
FIG. 8 illustrates a block diagram of an embodiment of a threat-tracking graphical user interface.

The cyber threat detection system can use a user interface module to present a threat-tracking graphical user interface to display any cyber threats identified by a cyber threat defense system. FIG. 8 illustrates a block diagram of a threat-tracking graphical user interface 800. The threat-tracking graphical user interface 800 can have one or more visual data containers representing the data objects created from the input data from a network entity. The threat-tracking graphical user interface 800 may have a topology map 810 displaying a two-dimensional or three-dimensional representation of the network. The topology map 810 can have one or more network nodes 812 acting as a visual data container for a network entity on the network. The topology map 810 can illustrate each connection between a network node 812 and any other network node 812 in contact with that network node 812. A network node 812 can be marked to indicate an issue with the represented network entity. The user analyst can select a network node 812 with the cursor to reveal more information about the represented network entity.

Upon the selection of a network entity via selection of the network node 812, the threat-tracking graphical user interface can display an action log 820 for that network entity. The action log 820 may list an action line 822 describing each action by that network entity over a set period. The threat-tracking graphical user interface 800 can append an alert to an action line 822 to indicate an automatic threat score indicating a hazard to the network. The threat-tracking graphical user interface can use the action log 820 to generate an activity graph 830 to show the amount of activity over time. The user analyst can identify problem network entities by identifying spikes in the activity graph. The user analyst can filter the action log 820 or the activity graph 830 based on user specified criteria, such as action type, entity type, time period, or threat level.

In addition to appending alerts to specific action lines 822 and network nodes 812, the threat-tracking graphical user interface can generate a triaged incident list 840 to highlight potential cyber threats. The triaged incident list 840 can list a set of one or more triage events 842, with each triage event 842 describing a potential cyber threat. Additionally, the triage event 842 can list a potential response, as determined by the autonomous response module. The triaged incident list 842 can describe every potential cyber threat present in a network. Alternately, the triage incident list 842 can be filtered by node, user, threat level, threat type, or other limitations.

Figure 9:
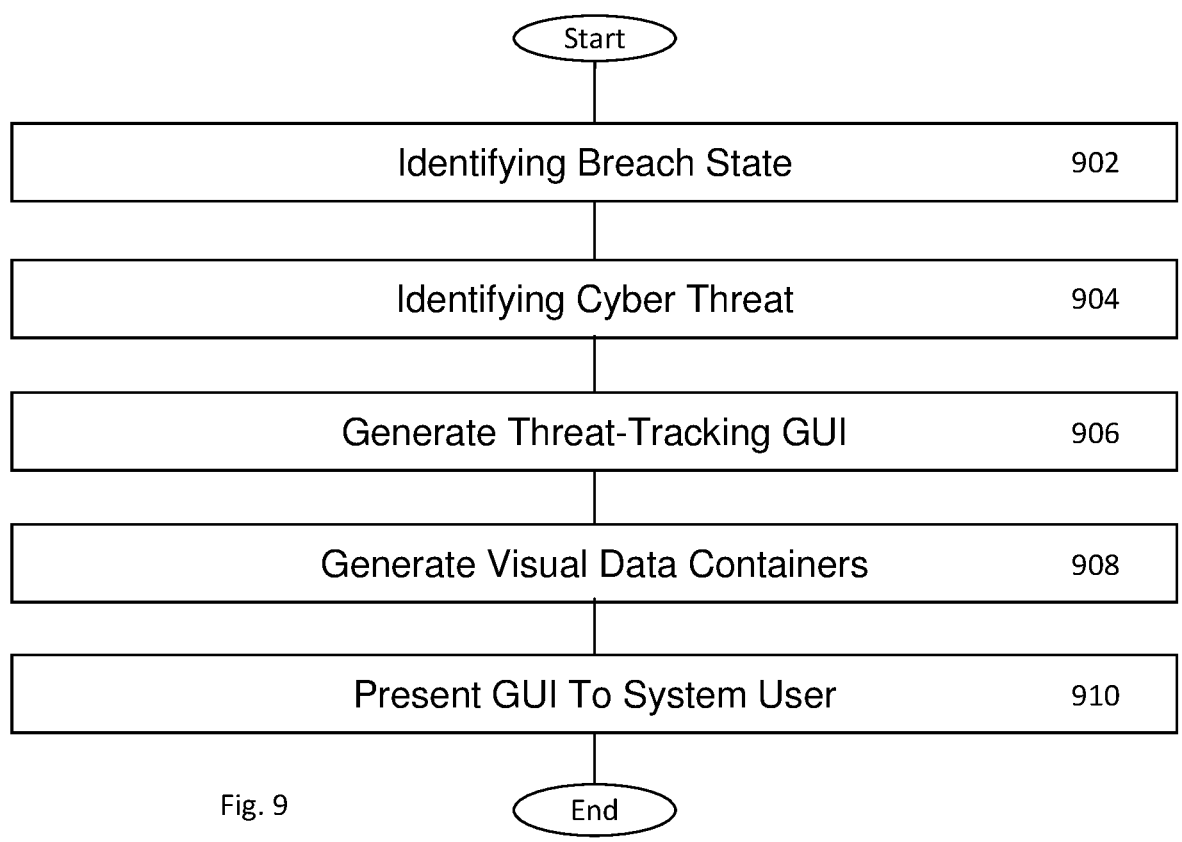
FIG. 9 illustrates a flowchart of an embodiment of a method for presenting a cyber threat to a system user.

FIG. 9 illustrates a flowchart of an embodiment of a method for presenting a cyber threat to a system user. A cyber threat defense system can have a comparison module configured to identify whether a network entity is in a breach state of a normal behavior benchmark (Block 902). The network entity represents at least one of a user and a device associated with a network. The normal behavior benchmark describes parameters corresponding to a normal pattern of activity for that network entity. The cyber threat defense system can have a cyber threat module configured to identify whether the breach state and a chain of relevant behavioral parameters deviating from a normal benign behavior of that network entity correspond to a cyber threat (Block 904).

A cyber threat defense system can have a user interface module configured to generate a threat-tracking graphical user interface to display a visual representation of data from a network entity describing network activity containing a potential cyber threat (Block 906). For example, the threat-tracking graphical user interface can display one or more data objects of the breach state and the chain of relevant behavioral parameters identified by the cyber threat module. The user interface can be configured to generate a set of one or more data containers for the threat-tracking graphical user interface to represent the data objects to be displayed (Block 908). The data containers may present as a network topology map, an action log, a connection data graph, or a triaged incident list. The network topology map displays connections between network devices. The action log lists a sequence of actions by the network entity. The connection data graph displays a quantity of connections at a selected network node. The triaged incident list can describe one or more potential threats to the network. The user interface module can be configured to present the threat-tracking graphical user interface to a system user belonging to a client team to review the cyber threat (Block 910).

Often when a system user is reviewing the input data from the network, that system user may discover unfamiliar scenarios. The cyber threat defense system can provide a system support expert working on a remote platform for a cyber threat defense system administrator to guide the system user through any new situations. The cyber threat defense system may provide a secure support platform for the system user and the system support expert to communicate. The user interface module may generate a query interface component as a popup box from the threat-tracking graphical user interface to allow the system user to securely contact the system support expert while viewing the input data from the network. Alternately, the user interface module may integrate the query interface component as a panel of the threat-tracking graphical user interface.

Figure 10:
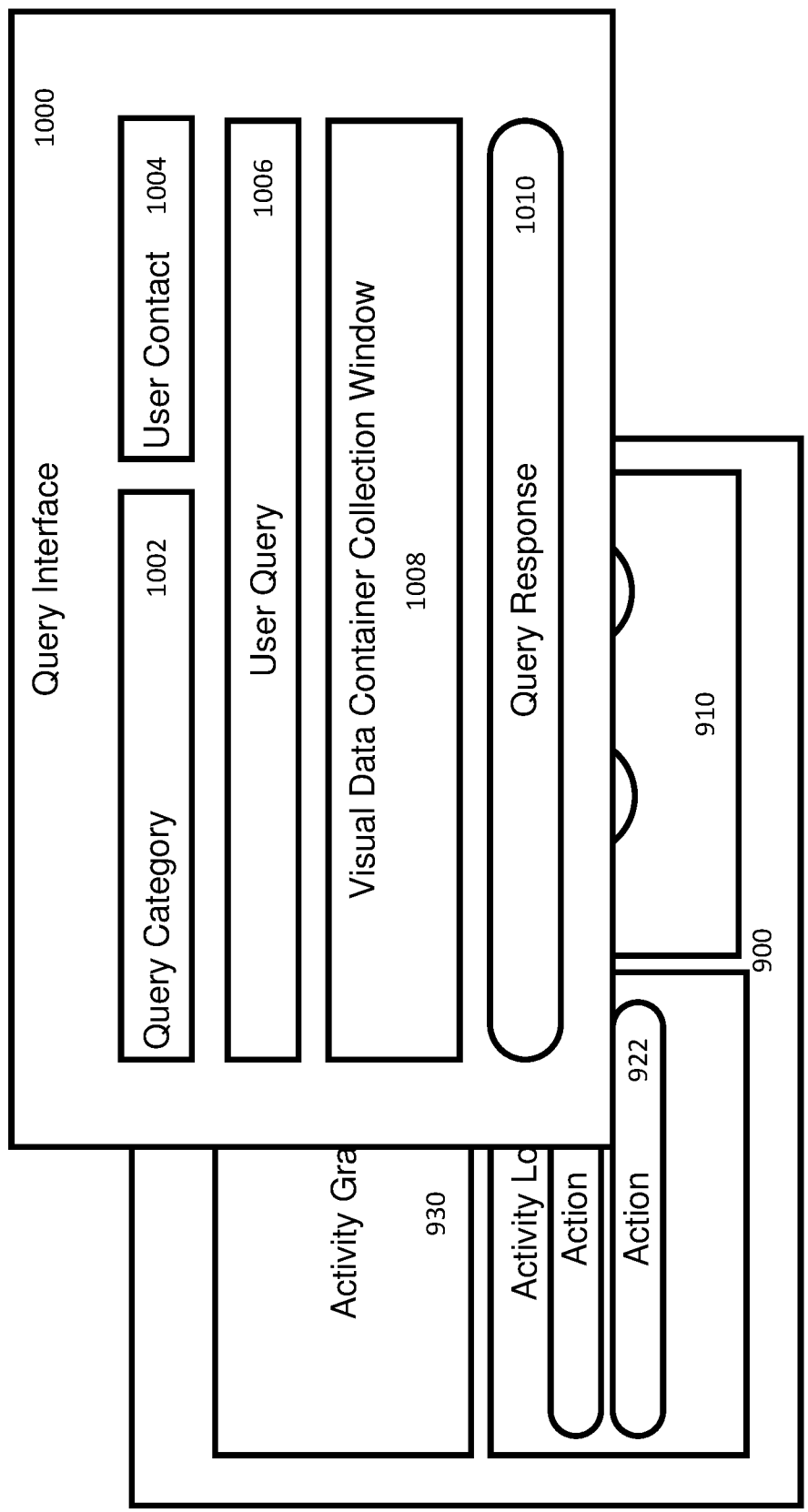
FIG. 10 illustrates a block diagram of an embodiment of a query interface component.

FIG. 10 illustrates a block diagram of a query interface component 1000. The query interface component 1000 can have a query category input 1002 to receive a user input from the system user describing the technical category of the query being submitted for the system support expert. The query interface component 1000 can have a user contact input 1004 to receive a user address for the system user. The user address can be an email address, a phone number, a chat handle, or other method of reaching the system user. The user address can be used to identify the user, with the alternate methods of communication presented by the user address providing a method for the system support expert to alert the system user of any messages remaining on the secure support platform. The query interface component 1000 can have a user query field 1006 to receive a question from a system user about one or more data points presented by the threat-tracking graphical user interface.

The query interface component 1000 can have a visual data container collection window 1008. A system user can perform a "digital grab" of a visual data container from elsewhere on the threat-tracking graphical user interface. The visual data container is a graphical object in the threat-tracking graphical user interface that represents a data object, either from the input data or created from the input data. The visual data container can be a line of text, a portion of a graph, a node in a network topology map, a connection in the network topology map, or other visual representation from the threat-tracking graphical user interface. The visual data container can contain instructions for the graphic rendering of the data object. The visual data container can also contain a handle that allows the user to select, or "grab", the data object from within the visual representation of the graphical user interface. The system user can transfer a copy of the visual data container to the visual data container collection window 1008. For example, the system user can copy the visual data container from the threat-tracking graphical user interface and paste the copy into the visual data container collection window 1008. Alternately, the system user can execute a drag-and-drop input on the visual data container. In a drag-and-drop input, the system user selects the visual data container with a cursor input and moves the visual data container over to the visual data container collection window 1008 before releasing the cursor. The query interface component 1000 can display a response to the user query from the system support expert in a query response field 1010. The query response field 1010 can expand to create a multimedia communication session between the system user and the system support expert. The cyber threat defense system can have an incident module configured to generate an incident ticket based on the user query and the data object.

The query interface component integrated into the threat-tracking graphical user interface is coded to be able to drag and drop data objects from the main UI instead of typing out manually or having to take a screenshot. This allows the remote expert analyst to see the literal data, as opposed to a summary provided by the customer in a textual message such as an email which may be an incorrect interpretation, allowing the analyst responding to draw their own conclusions and make the correct recommendations. The query interface component, such as a question builder, integrated into the threat-tracking graphical user interface requires no redirection to a specific third party help/support website. Also, standard/familiar investigation panes can be dragged into the query interface component without using a separate or unfamiliar interface.

Figure 11:
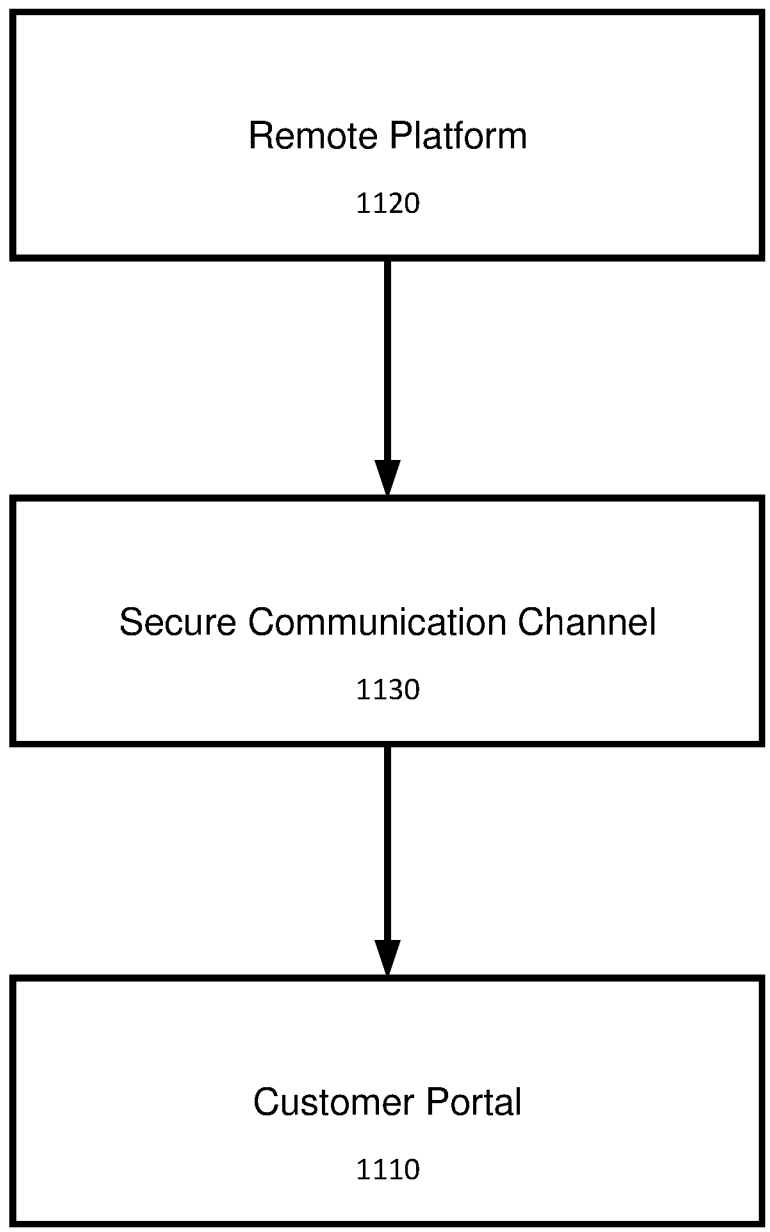
FIG. 11 illustrates a block diagram of an embodiment of an expert communication pipeline.

FIG. 11 illustrates a block diagram of an expert communication pipeline. Upon the generation of the incident ticket, the cyber threat defense system may store the incident ticket as a string within the cyber defense platform 1110. A system support expert can operate a cloned user interface on a remote platform 1120 at the cyber threat defense system administrator. The remote platform 1120 can connect to the cyber threat defense platform 1110 via a secure communication channel 1130. The remote platform 1120 can retrieve a query and the object code for a data object represented by the visual data container selected by the system user. The cloned user interface on the remote platform 1120 can then use the object code to reproduce the visual data container.

Figure 12:
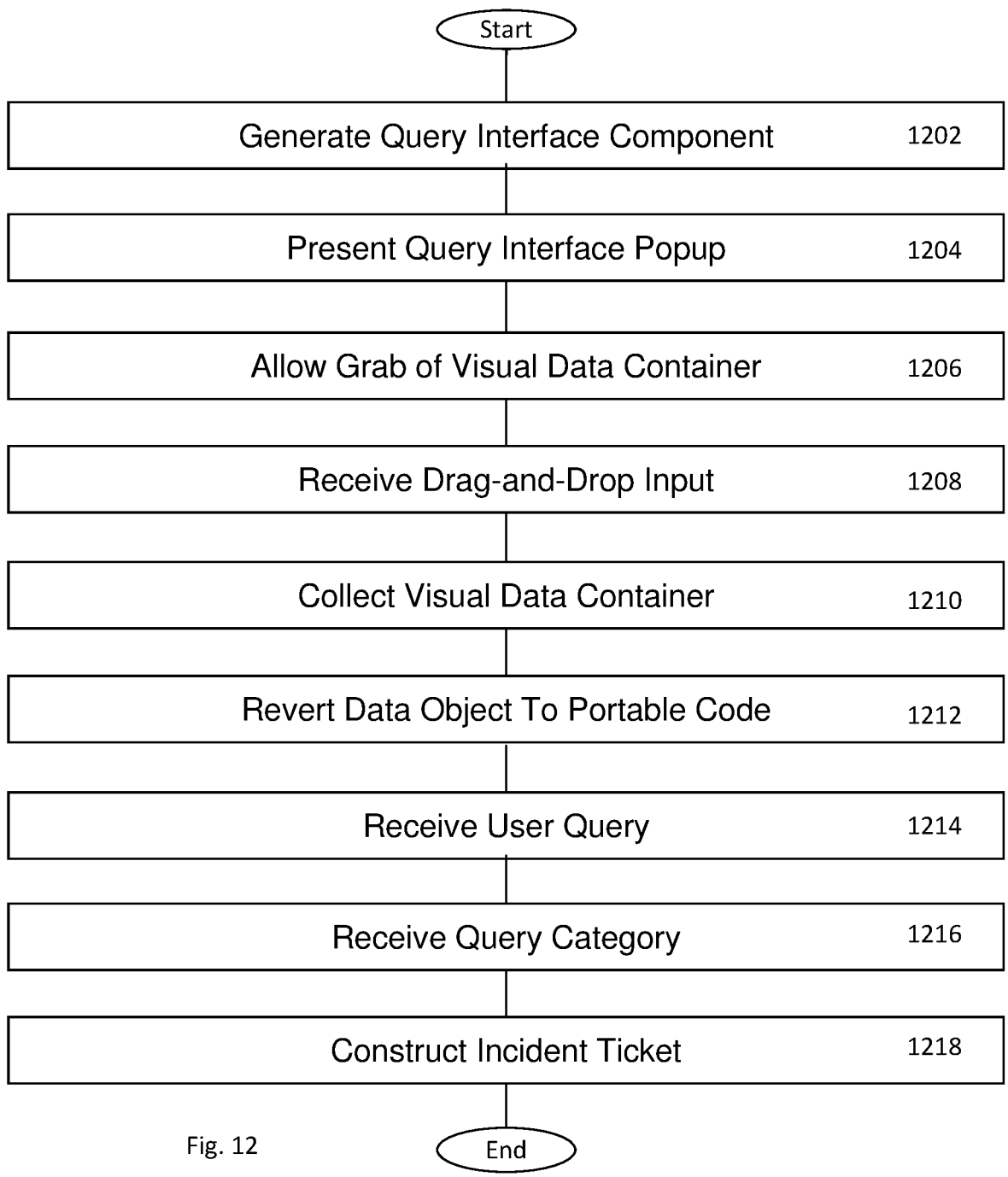
FIG. 12 illustrates a flowchart of an embodiment of a method for generating an incident ticket.

FIG. 12 illustrates a flowchart of an embodiment of a method for generating an incident ticket. The user interface module is configured to generate a query interface component integrated into the threat-tracking graphical user interface to receive the query for assistance from the system user (Block 1202). The user interface module is configured to present the query interface component to the system user (Block 1204). The user interface module can present the query interface component as a popup window to allow for unobstructed viewing of the threat-tracking graphical user interface by the system user and the system support expert on the remote platform. The user interface module is configured to allow the system user to digitally grab a visual data container displaying information in the visual representation presented by the threat-tracking graphical user interface and containing a data object of the data from the network entity (Block 1206). The user interface module is configured to receive a drag-and-drop input from the system user to move a copy of the data objects into a collection window for the query interface component from the system user to the query interface component. The data objects contain a literal copy of the data as opposed to a summarization of the data so that the analyst responding can analyze the raw data to draw their own conclusions and make the correct recommendations (Block 1208). The user interface module is configured to collect the visual data container from the threat-tracking graphical user interface into a collection window of the query interface component (Block 1210). The user interface module is configured to revert the copy of the data object to a set of portable code for conversion to a copy of the visual data container at the remote platform for the system support expert (Block 1212). The user interface module is configured to receive a query from the system user regarding the cyber threat (Block 1214). The user interface module is configured to receive a query category to describe the technical category of query (Block 1216). The cyber threat defense system can have an incident module configured to construct an incident ticket in a multimedia format (Block 1214). The incident ticket can contain an identified breach state and the chain of relevant behavioral parameters, which further includes i) connection logs extracted from the threat-tracking graphical user interface, ii) graphical representations extracted from the threat-tracking graphical user interface, iii) triaged incidents extracted from the threat-tracking graphical user interface, iv) analyst comments, v) and any combination of these. The incident ticket containing the query is securely communicated between the threat-tracking graphical user interface to a knowledgeable party at a platform at a remote location who can directly respond to the query within the same threat-tracking graphical user interface because the communication channel between the platform at the remote location and the threat-tracking graphical user interface is natively built into the coding of the graphical user interface.

Figure 13:
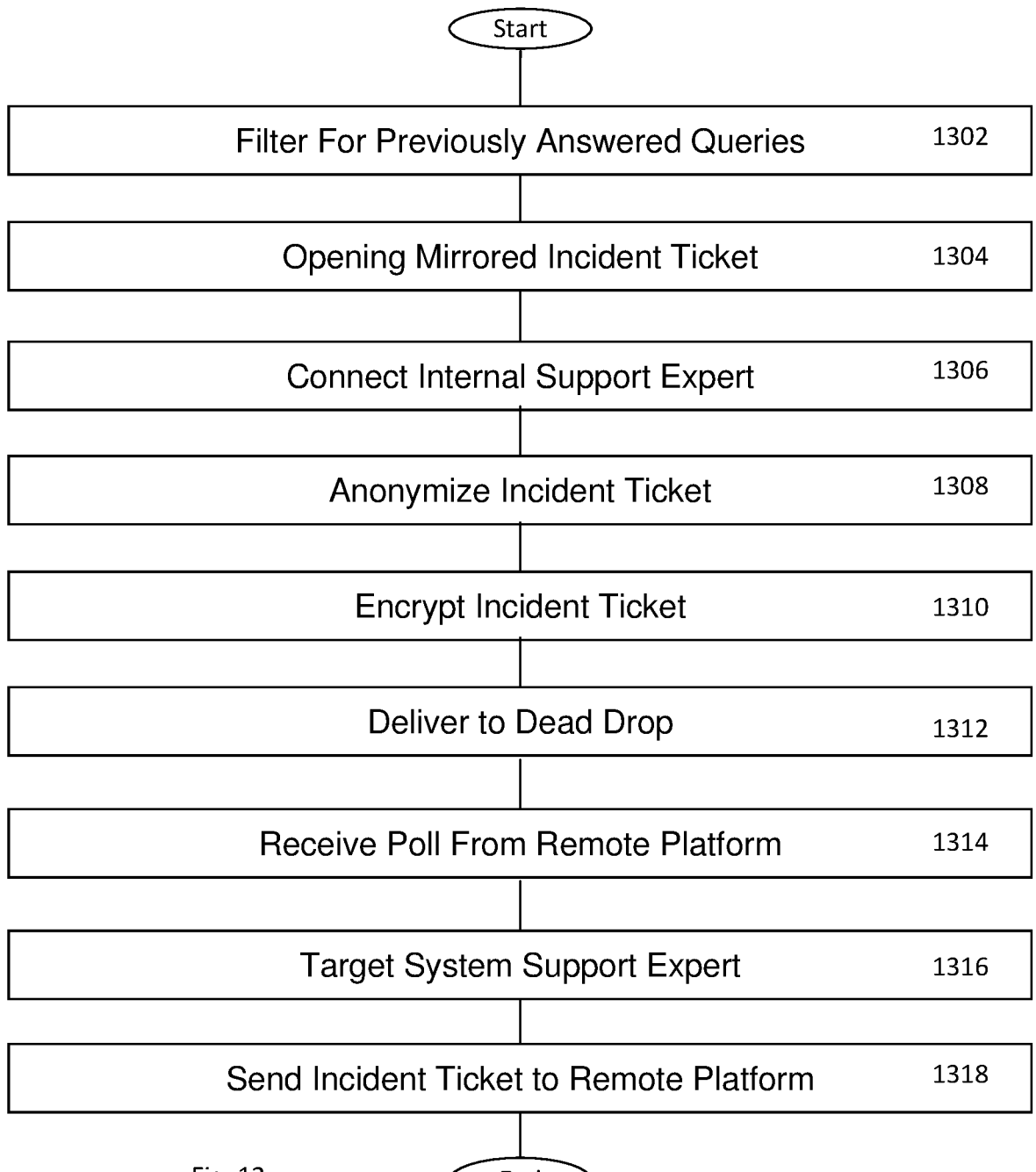
FIG. 13 illustrates a flowchart of an embodiment of a method for sending an incident ticket to a system support expert.
Figure 14:
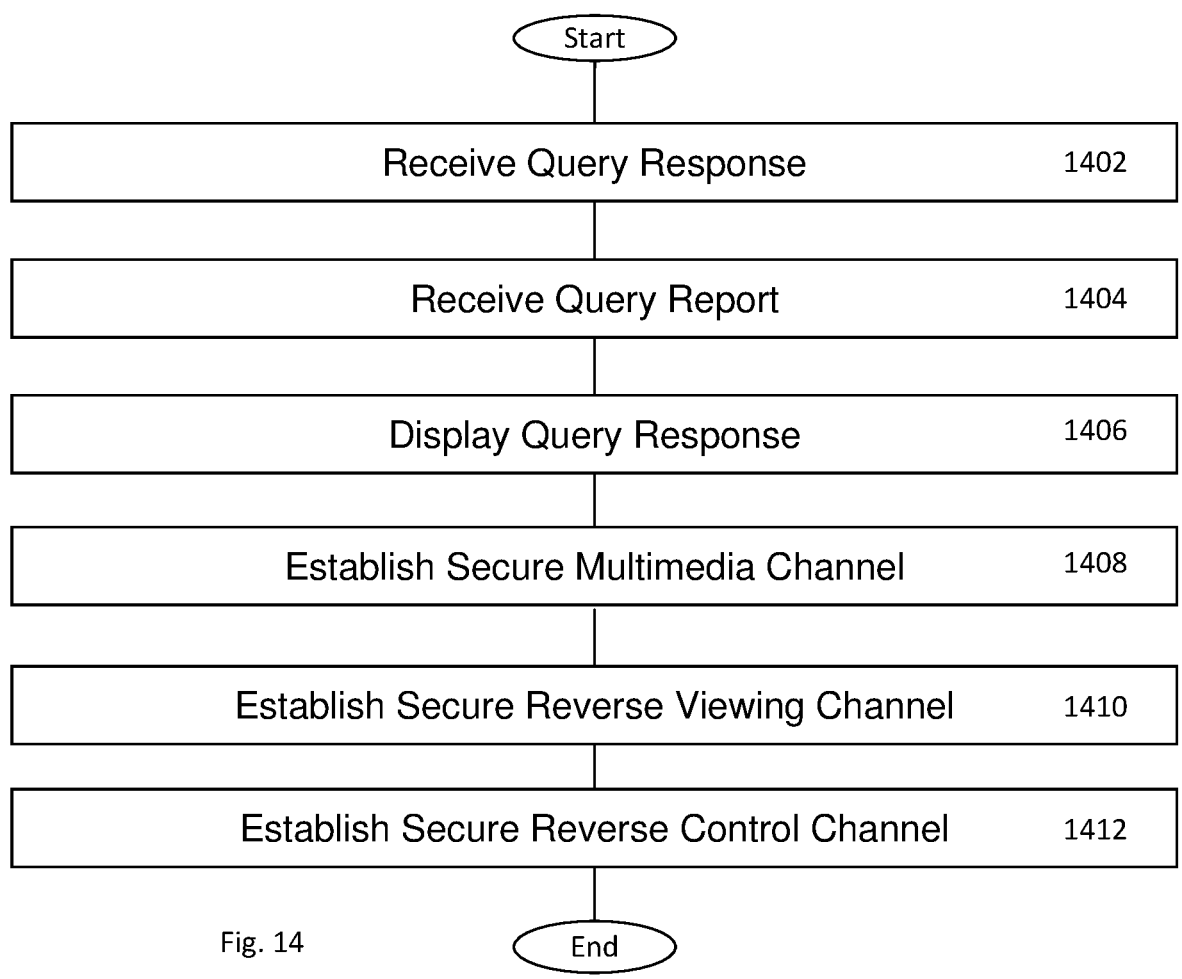
FIG. 14 illustrates a flowchart of an embodiment of a method for receiving a query response.

FIG. 13 illustrates a flowchart of an embodiment of a method for providing an incident ticket containing the query for assistance and a copy of the visual data container to a system support expert at a remote platform from the threat-tracking graphical user interface for a response to the query. The incident module can filter the incident tickets for previously answered queries, as determined by the query report (Block 1302). The incident module can be configured to open the incident ticket as a mirrored incident ticket to other members of the client team (Block 1304). The communication module can be configured to connect to an internal support expert on the client team responding to the incident ticket after opening the incident ticket if an internal support expert can handle the incident ticket (Block 1306). Otherwise, the incident module can be configured to anonymize an incident ticket to remove any personally identifiable information before providing the incident ticket to the system support expert (Block 1308). The incident module can be configured to encrypt an incident ticket before providing the incident ticket to the system support expert to make the incident ticket unreadable until unlocked by the system support expert (Block 1310). The cyber threat defense system can have a communication module can be configured to deliver the incident ticket to a dead drop host for later retrieval by the system support expert (Block 1312). Alternately, the communication module can receive a poll for incident tickets from the remote platform (Block 1314). The sending of the incident ticket containing the query occurs in response to polling from a remote platform to retrieve the incident ticket containing the query. The communication module is configured to target the system support expert for delivery of the incident ticket based on a query category for the query (Block 1316). The communication module is configured to send an incident ticket containing the query for assistance and a copy of the visual data container to a system support expert at a remote platform from the threat-tracking graphical user interface for a response to the query (Block 1318). FIG. 14 illustrates a flowchart of an embodiment of a method for receiving a query response. The communication module can be configured to receive the query response from the system support expert (Block 1402). The communication module can be configured to receive, from the system support expert, a query report listing a series of queries from the system user and query responses from the system support expert for a report period (Block 1404). The cyber threat defense system can use the query report to filter queries for previously answered questions. The user interface module can be configured to display the query response to the system user in the query interface component (Block 1406). The communication module can be configured to establish a secure multimedia channel between the threat-tracking graphical user interface and the system support expert at the remote platform (Block 1408). The secure multimedia channel provides for the exchange of audio, visual, or textual information, as well as for visual data containers from the threat-tracking graphical user interface. Further, as the secure multimedia channel is embedded within the cyber threat defense system, no valuable data is exposed to external communication systems. The communication module can be configured to establish a secure reverse viewing channel with the system support expert to allow the system support expert to view the threat-tracking graphical user interface as presented to the system user (Block 1410). The communication module can be configured to establish a secure reverse control channel with the system support expert to allow the system support expert to both view and control the threat-tracking graphical user interface while presented to the system user (Block 1412).

The cyber threat defense system can use a logging module maintain a log of each question asked by a client team as an incident report. The cyber threat defense system administrator can use this record to bill the client team for usage. FIG. 15 illustrates a block diagram of an embodiment of an incident report. The incident report can have a category field 1502 describing the technical category of the question. The logging module can use the category for sorting purposes. The system user providing the query can select the category or the logging module can use clustering techniques to automatically determine the category. The incident report can have a visual data container field 1504 storing the visual data container selected by the system user. The incident report can have a query field 1506 to store the query about the visual data container written by the system user.

The incident report can have a timestamp 1508 to indicate when the query was submitted. The incident report can have an owner field 1510 indicating the system user submitting the claim. A later system user can then confer with the previous system user. Additionally, the client team can track any system user that is abusing the expert service. The incident report can have a status field 1512 describing the resolution of the query.

Figure 16:
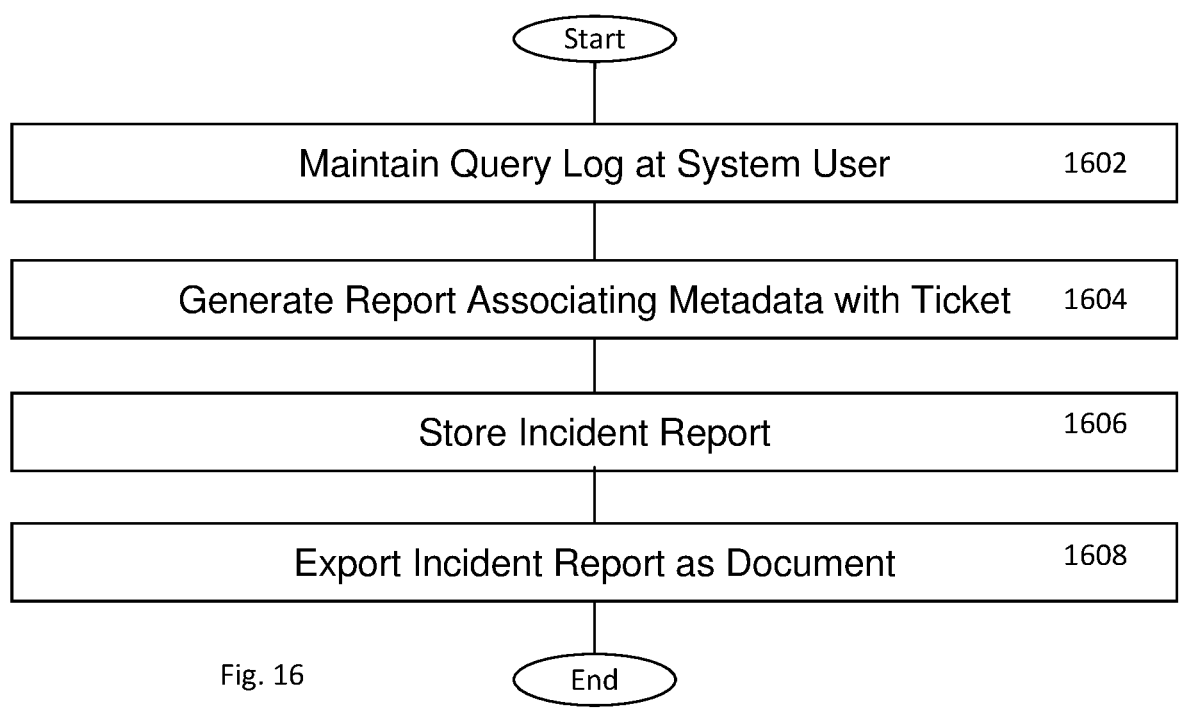
FIG. 16 illustrates a flowchart of an embodiment of a method for logging an incident report.

FIG. 16 illustrates a flowchart of an embodiment of a method for logging an incident report. The logging module is configured to maintain a query log on the cyber threat appliance for the client team listing previous incident queries to the system support expert from the client team (Block 1602). The logging module is configured to generate an incident report to associate a set of metadata describing the incident ticket with the incident ticket (Block 1604). The metadata can include a time of origin, the system user submitting the query, and the status of the resolution of the query. The logging module is configured to store the incident ticket as an incident report in the data store for later review (Block 1606). The logging module is configured to export the incident report as a document, with rendered visual data containers for static review (Block 1608).

Web Site

The web site is configured as a browser-based tool or direct cooperating app tool for configuring, analyzing, and communicating with the cyber threat defense system.

Network

A number of electronic systems and devices can communicate with each other in a network environment. FIG. 17 illustrates in a simplified diagram a networked environment being protected by the cyber threat defense system 100 with a cyber threat appliance installed in the network. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system) can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes, but is not limited to, software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A method for a cyber threat defense system, comprising:
    generating a threat-tracking graphical user interface to display a visual representation of data from a network entity describing network activity containing a potential cyber threat;
    generating a query interface component integrated into the threat-tracking graphical user interface to receive a query for assistance;
    presenting the threat-tracking graphical user interface and the query interface component to a system user belonging to a client team to review the potential cyber threat;
    allowing the system user to digitally grab a visual data container displaying information in the visual representation presented by the threat-tracking graphical user interface and containing a data object of the data from the network entity;
    collecting the visual data container from the threat-tracking graphical user interface into a collection window of the query interface component;
    providing an incident ticket containing the query for assistance and a copy of the visual data container to a system support expert within the cyber threat appliance and optionally, at a remote platform from the threat-tracking graphical user interface for a response to the query; and
    constructing an incident ticket in a multimedia format that includes the breach state and the chain of relevant behavioral parameters, which further includes i) connection logs extracted from the threat-tracking graphical user interface, ii) graphical representations extracted from the threat-tracking graphical user interface, iii) triaged incidents extracted from the threat-tracking graphical user interface, iv) analyst comments, v) and any combination of these, where the incident ticket containing the query is securely communicated between the threat-tracking graphical user interface to a knowledgeable party at a platform at a remote location who can directly respond to the query within the same threat-tracking graphical user interface because the communication channel between the platform at the remote location and the threat-tracking graphical user interface is natively built into the coding of the graphical user interface.

2. The method for the cyber threat defense system of claim 1, further comprising:
    presenting the query interface component integrated into the threat-tracking graphical user interface to come up as a pop up window when activated that allows the system support expert at a remote location to analyze information being displayed on the threat-tracking graphical user interface along with the system user viewing the threat-tracking graphical user interface.

3. The method for the cyber threat defense system of claim 1, further comprising:
    receiving a poll for incident tickets from the remote platform; and
    in response to polling from the remote platform to retrieve the incident ticket containing the query, sending the incident ticket to the remote platform for the system support expert.

4. The method for the cyber threat defense system of claim 1, further comprising:
    receiving a drag-and-drop input from the system user selecting the visual data container containing the data object to move a copy of the data object into the collection window of the query interface component, where the data objects contain a literal copy of the data as opposed to a summarization of the data.

5. A method for a cyber threat defense system, comprising:
    generating a threat-tracking graphical user interface to display a visual representation of data from a network entity describing network activity containing a potential cyber threat;
    generating a query interface component integrated into the threat-tracking graphical user interface to receive a query for assistance;
    presenting the threat-tracking graphical user interface and the query interface component to a system user belonging to a client team to review the potential cyber threat;
    allowing the system user to digitally grab a visual data container displaying information in the visual representation presented by the threat-tracking graphical user interface and containing a data object of the data from the network entity;
    collecting the visual data container from the threat-tracking graphical user interface into a collection window of the query interface component;
    providing an incident ticket containing the query for assistance and a copy of the visual data container to a system support expert within the cyber threat appliance and optionally, at a remote platform from the threat-tracking graphical user interface for a response to the query; and
    reverting the copy of the data object to a set of portable code for conversion to a copy of the visual data container at the remote platform.

6. The method for the cyber threat defense system of claim 1, further comprising:

encrypting an incident ticket to make the incident ticket unreadable until unlocked by the system support expert.

7. The method for the cyber threat defense system of claim 1, further comprising:
targeting the system support expert for delivery of the incident ticket based on a query category for the query.

8. A method for a cyber threat defense system, comprising:
generating a threat-tracking graphical user interface to display a visual representation of data from a network entity describing network activity containing a potential cyber threat;
generating a query interface component integrated into the threat-tracking graphical user interface to receive a query for assistance;
presenting the threat-tracking graphical user interface and the query interface component to a system user belonging to a client team to review the potential cyber threat:
allowing the system user to digitally grab a visual data container displaying information in the visual representation presented by the threat-tracking graphical user interface and containing a data object of the data from the network entity;
collecting the visual data container from the threat-tracking graphical user interface into a collection window of the query interface component;
providing an incident ticket containing the query for assistance and a copy of the visual data container to a system support expert within the cyber threat appliance and optionally, at a remote platform from the threat-tracking graphical user interface for a response to the query; and
delivering the incident ticket to a dead drop host for later retrieval by the system support expert.

9. A cyber-threat defense system, comprising:
a cyber threat module configured to identify whether a breach state and a chain of relevant behavioral parameters deviating from the normal benign behavior of that network entity correspond to a cyber threat;
a user interface module configured to generate a threat-tracking graphical user interface to display one or more data objects of the breach state and the chain of relevant behavioral parameters identified by the cyber threat module, to generate a query interface component integrated into the threat-tracking graphical user interface to receive a query for assistance, to present the threat-tracking graphical user interface and the query interface component to a system user belonging to a client team to review the potential cyber threat, to allow the system user to digitally grab a visual data container displaying information in the visual representation presented by the threat-tracking graphical user interface and containing a data object of the data from the network entity, and to collect the visual data container from the threat-tracking graphical user interface into a collection window of the query interface component;
an incident module to generate an incident ticket containing the query for assistance and a copy of the visual data container;
a communication module to provide the incident ticket to a system support expert at a remote platform from the threat-tracking graphical user interface for a response to the query; and
where the communication module is configured to establish a secure reverse control channel with the system support expert to view and manipulate the threat-tracking graphical user interface while presented to the system user.

10. The apparatus for the cyber threat defense system of claim 9, wherein the communication module is configured to receive the query response from the system support expert.

11. The apparatus for the cyber threat defense system of claim 9, wherein the communication module is configured to receive, from the system support expert, a query report listing a series of queries from the system user and query responses from the system support expert for a report period.

12. The apparatus for the cyber threat defense system of claim 9, further comprising:
a logging module configured to maintain a query log on a cyber threat defense system user interface for the client team listing previous incident queries to the system support expert from the client team.

13. The apparatus for the cyber threat defense system of claim 9, further comprising:
a logging module configured to store the incident ticket as an incident report for later review.

14. The apparatus for the cyber threat defense system of claim 13, wherein the logging module can be configured to export the incident report as a document.

15. The apparatus for the cyber threat defense system of claim 9, wherein the communication module is configured to connect to an internal support expert responding to the incident ticket after opening the incident ticket as a mirrored incident ticket to the client team.

16. A cyber-threat defense system, comprising:
a cyber threat module configured to identify whether a breach state and a chain of relevant behavioral parameters deviating from the normal benign behavior of that network entity correspond to a cyber threat;
a user interface module configured to generate a threat-tracking graphical user interface to display one or more data objects of the breach state and the chain of relevant behavioral parameters identified by the cyber threat module, to generate a query interface component integrated into the threat-tracking graphical user interface to receive a query for assistance, to present the threat-tracking graphical user interface and the query interface component to a system user belonging to a client team to review the potential cyber threat, to allow the system user to digitally grab a visual data container displaying information in the visual representation presented by the threat-tracking graphical user interface and containing a data object of the data from the network entity, and to collect the visual data container from the threat-tracking graphical user interface into a collection window of the query interface component;
an incident module to generate an incident ticket containing the query for assistance and a copy of the visual data container;
a communication module to provide the incident ticket to a system support expert at a remote platform from the threat-tracking graphical user interface for a response to the query; and
wherein the communication module is configured to establish a secure multimedia communication channel between the threat-tracking graphical user interface and the system support expert at the remote platform to exchange any of audio, visual, and textual information through the multimedia communication channel which is constructed as part of a native portion of user interface; and thus, does not require accessing an external communication system to securely exchange the audio, visual, and textual information with a platform used by the system support expert.

17. A network, comprising:
   at least one firewall;
   at least one network switch;
   multiple computing devices operable by users of the network;
   a cyber-threat coordinator-component that includes
      one or more input ports to connect to one or more probes deployed to a network entity representing at least one of a user and a network device,
      an ingestion module configured to collect, from the one or more probes, input data describing network-administrated activity executed by the network entity;
      a comparison module configured to execute a comparison of the input data set from the ingestion module to at least one machine-learning model trained on a normal benign behavior of that network entity using a normal behavior benchmark describing parameters corresponding to a normal pattern of activity for that network entity to spot behavior on the network deviating from the normal benign behavior to identify whether the network entity is in a breach state of the normal behavior benchmark;
      a cyber threat module configured to identify whether the breach state identified by the comparison module and a chain of relevant behavioral parameters deviating from the normal benign behavior of that network entity correspond to a cyber threat;
      a user interface module configured to generate a threat-tracking graphical user interface to display one or more data objects of the cyber threat identified by the cyber threat module, to generate a query interface component integrated into the threat-tracking graphical user interface to receive a query for assistance, to present the threat-tracking graphical user interface and the query interface component to a system user belonging to a client team to review the potential cyber threat, to allow the system user to digitally grab a visual data container displaying information in the visual representation presented by the threat-tracking graphical user interface and containing a data object of the data from the network entity, and to collect the visual data container from the threat-tracking graphical user interface into a collection window of the query interface component;
      an incident module to generate an incident ticket containing the query for assistance and a copy of the visual data container; and
      a communication module to provide the incident ticket to a system support expert at a remote platform from the threat-tracking graphical user interface for a response to the query; and
   wherein the cyber-threat coordinator-component reduces overhead by automatically maintaining security for the threat-tracking graphical user interface and minimizing an amount of CPU cycles, memory space, and power consumed in operating the threat-tracking graphical user interface while communicating with other users.

* * * * *